United States Patent
Card et al.

(10) Patent No.: US 6,810,291 B2
(45) Date of Patent: Oct. 26, 2004

(54) SCALABLE, HIERARCHICAL CONTROL FOR COMPLEX PROCESSES

(75) Inventors: Jill P. Card, West Newbury, MA (US); Edward A. Rietman, Nashua, NH (US)

(73) Assignee: Ibex Process Technology, Inc., Lowell, MA (US)

( * ) Notice: Subject to any disclaimer, the term of this patent is extended or adjusted under 35 U.S.C. 154(b) by 246 days.

(21) Appl. No.: 10/243,963

(22) Filed: Sep. 13, 2002

(65) Prior Publication Data

US 2003/0083757 A1 May 1, 2003

Related U.S. Application Data

(60) Provisional application No. 60/322,406, filed on Sep. 14, 2001.

(51) Int. Cl.[7] .............................................. G05B 13/04
(52) U.S. Cl. .............................. 700/48; 700/121; 438/5
(58) Field of Search .............................. 700/30, 31, 33, 700/36, 44, 48, 49, 50, 121; 438/5, 7, 8

(56) References Cited

U.S. PATENT DOCUMENTS

| | | | | |
|---|---|---|---|---|
| 4,912,624 A | * | 3/1990 | Harth et al. | 700/36 |
| 4,975,827 A | * | 12/1990 | Yonezawa | 700/31 |
| 5,301,101 A | * | 4/1994 | MacArthur et al. | 700/36 |
| 5,305,221 A | * | 4/1994 | Atherton | 700/96 |
| 5,521,814 A | * | 5/1996 | Teran et al. | 700/266 |
| 5,682,309 A | * | 10/1997 | Bartusiak et al. | 700/29 |
| 5,740,033 A | | 4/1998 | Wassick et al. | |
| 5,781,432 A | * | 7/1998 | Keeler et al. | 700/44 |
| 6,128,540 A | * | 10/2000 | Van Der Vegt et al. | 700/36 |
| 6,207,936 B1 | * | 3/2001 | de Waard et al. | 219/497 |
| 6,408,220 B1 | * | 6/2002 | Nulman | 700/121 |
| 6,587,744 B1 | * | 7/2003 | Stoddard et al. | 700/121 |
| 6,708,073 B1 | * | 3/2004 | Heavlin | 700/121 |

FOREIGN PATENT DOCUMENTS

| | | | | |
|---|---|---|---|---|
| DE | 196 37 917 A1 | 3/1998 | | G05B/13/04 |
| WO | WO 01/57605 | 8/2001 | | G05B/13/04 |

OTHER PUBLICATIONS

"A comparative analysis of run–to–run control algorithms in the seminconductor manufacturing industry"; Ning et al.; Proceedings of Advanced Semiconductor Manufacturing Conference and Workshop; Nov. 12–14, 1996; pp. 375–381.*
"An adaptive run–to–run optimizing controller for linear and nonlinear semiconductor processes"; Del Castillo et al.; IEEE Transactions on Semiconductor Manufacturing; May 1998, vol. 11; Issue 2; pp. 285–295.*
"Model–based control in microelectronics manufacturing"; Edgar et al.; Proceedings of the 38th Conference on Decision and Control; Dec. 7–10, 1999; vol. 4; pp. 4185–4191.*
"A study in dynamic neural control of semiconductor fabrication processes"; Card, J.P.; IEEE Transactions on Semiconductor Manufacturing; Aug. 2000; vol. 13; Issue 3; pp. 359–365.*
Card et al., *Dynamic Neural Control for Plasma Etch Process*, IEEE Transactions on Neural Networks, 1997.
Rietman et al., *A System Model for Feedback Control and Analysis of Yield: A Multistep Process Model of Effective Gate Length, Poly Line Width, and IV Parameters*, IEEE, 2001.
Kim et al., *Intelligent Control of Via Formation by Photosensitive BCB for MCM–L/D Applications*, IEEE Transactions on Semiconductor Manufacturing, 12:503, 1999.

* cited by examiner

*Primary Examiner*—Emanuel Todd Voeltz
(74) *Attorney, Agent, or Firm*—Testa, Hurwitz & Thibeault, LLP

(57) ABSTRACT

The present invention provides a method and system for complex process optimization utilizing metrics, operational variables, or both, of one or more process steps and optimization of one or more of these process step parameters with respect to a cost function for the parameter. In one embodiment, the invention provides a scalable, hierarchical optimization method utilizing optimizations at one process level as inputs to an optimization of a higher or lower process level.

27 Claims, 14 Drawing Sheets

SCALABLE, HIERARCHICAL CONTROL FOR COMPLEX PROCESSES

CROSS REFERENCE TO RELATED APPLICATIONS

The present application claims the benefit of and priority to copending U.S. provisional application Ser. No. 60/322,406, filed Sep. 14, 2001, the entire disclosure of which is herein incorporated by reference.

FIELD OF THE INVENTION

The invention relates to the field of data processing and process control. In particular, the invention relates to non-linear regression prediction and/or control of complex multi-step processes.

BACKGROUND

Process prediction and control is crucial to optimizing the outcome of complex multi-step production processes. For example, the production process for integrated circuits comprises hundreds of process steps (i.e., sub-processes). In turn, each process step may have several controllable parameters, or inputs, that affect the outcome of the process step, subsequent process steps, and/or the process as a whole. In addition, the impact of the controllable parameters on outcome may vary from process run to process run, day to day, or hour to hour. The typical integrated circuit fabrication process thus has a thousand or more controllable inputs, any number of which may be cross-correlated and have a time-varying, nonlinear relationship with the process outcome. As a result, process prediction and control is crucial to optimizing process parameters and to obtaining, or maintaining, acceptable outcomes.

SUMMARY OF THE INVENTION

The present invention provides a method and system for complex process prediction and optimization utilizing sub-process metrics and optimization of the sub-process metrics with respect to a cost function for the process.

In one aspect, the invention comprises: (1) providing a map between the sub-process metrics and process metrics using a nonlinear regression model; (2) providing one or more target process metrics; (3) providing an acceptable range of values for the sub-process metrics to define a sub-process metric constraint set; (4) providing a cost function for the sub-process metrics; and (5) determining values for the sub-process metrics that are within the constraint set, and that produce at the lowest cost a process metric(s) that is as close as possible to the target process metric(s) in order to define target sub-process metrics for each sub-process.

In another aspect of the invention, steps (1) to (5) in the preceding paragraph are applied at different hierarchical process levels. For example these steps may be repeated for sub-sub-processes of one or more sub-processes. (That is, the sub-process becomes the "process" of steps (1) to (5) and the sub-sub-process becomes the "sub-process.") Similarly, in another aspect of the invention, steps (1) to (5) in the preceding paragraph are repeated for a higher level process composed of two or more processes from step (1). (That is, the process becomes the "sub-process" of the new higher level process.) In effect, the present invention may perform a hierarchical series of steps (1) to (5) that can be scaled to any level of the overall production process.

As used herein, the term "metric" refers to any parameter used to measure the outcome or quality of a process or sub-process. Metrics include parameters determined both in situ during the running of a sub-process or process, and ex situ, at the end of a sub-process or process.

The map between sub-process metrics and process metrics is preferably determined by training a nonlinear regression model against measured sub-process and process metrics. The sub-process metrics from each of the sub-processes serve as the input to a nonlinear regression model, such as a neural network. The output for nonlinear regression model is the process metric(s). The nonlinear regression model is preferably trained by comparing a calculated process metric(s), based on measured sub-process metrics for an actual process run, with the actual process metric(s) as measured for the actual process run. The difference between calculated and measured process metric(s), or the error, is used to compute the corrections to the adjustable parameters in the regression model. If the regression model is a neural network, these adjustable parameters are the connection weights between the layers of the neurons in the network.

In one embodiment, the nonlinear regression model is a neural network. In one version, the neural-network model architecture comprises a two-layer feedforward model with cascade correlation of the single hidden-layer nodes and an adaptive gradient algorithm for back-propagation of prediction errors to adjust network weights. Hidden units are added one at a time (or in vector candidate groups) and trained to maximize the correlation between the hidden unit's outputs and the residual error at the output of the current training process metrics (i.e., the training vector). Previously hidden units are connected or "cascaded" through weights to subsequent units to reduce the residual error not explained by previous hidden nodes.

In another aspect, the present invention comprises: (1) providing a map between the sub-process metrics and process metrics using a nonlinear regression model; (2) providing one or more target process metrics; (3) providing an acceptable range of values for the sub-process metrics to define a sub-process metric constraint set; (4) providing a cost function for the sub-process metrics; (5) determining values for the sub-process metrics that are within the constraint set, and that produce at the lowest cost a process metric(s) that is as close as possible to the target process metric(s) in order to define target sub-process metrics for each sub-process; (6) determining a map between the operational variables of a sub-process and the metrics of the sub-process; (7) providing a cost function for the sub-process operational variables; and (8) determining values for the sub-process operational variables that produce at the lowest cost the sub-process metric, and that are as close as possible to the target sub-process metric values.

As used herein, the term "operational variables" includes sub-process controls that can be manipulated to vary the sub-process procedure, such as set point adjustments (referred to herein as "manipulated variables"), variables that indicate the wear, repair, or replacement status of a sub-process component(s) (referred to herein as "replacement variables"), and variables that indicate the calibration status of the sub-process controls (referred to herein as "calibration variables"). Furthermore, it should be understood that acceptable values of sub-process operational variables include, but are not limited to, continuous values, discrete values and binary values.

For example, where the process comprises plasma etching of silicon wafers, the operational variables for a plasma etch sub-process, such as performed by a LAM 4520 plasma etch tool, may be as follows: manipulated variables ("MV") may include, e.g., RF power and process gas flow; replacement variables ("RV") may include, e.g., time since last electrode replacement and/or a binary variable that indicates the need to replace/not replace the electrodes; and calibration variables ("CalV") may include, e.g., time since last machine calibration and/or the need for calibration.

In another aspect, the invention comprises: (1) providing a map between the sub-process metrics and sub-process operational variables and the process metrics using a non-linear regression model; (2) providing one or more target process metrics; (3) providing an acceptable range of values for the sub-process metrics and sub-process operational variables to define a sub-process operational constraint set; (4) providing a cost function for the sub-process metrics and operational variables; and (5) determining values for the sub-process metrics and operational variables that are within the constraint set, and that produce at the lowest cost a process metric(s) that is as close as possible to the a target process metric(s) in order to define target sub-process metrics and target operational variables for each sub-process.

In another aspect, the invention comprises: (1) providing one or more target process metrics; (2) determining values for the sub-process metrics that are within a constraint set, and that produce at the lowest cost a process metric(s) that is as close as possible to the target process metric(s) to define a target sub-process metric for each sub-process; (3) detecting a substantial deviation in the metric(s) of at least one sub-process from its sub-process target metrics that defines a deviating sub-process; and (4) determining values for the sub-process metrics of the sub-process(es) downstream of the deviating sub-process, which metrics are within a constraint set and produce at the lowest cost a process metric(s) that is as close as possible to the target process metric(s) to define a compensating target sub-process metric(s) for each downstream sub-process. In this aspect, the present invention provides a method and system for minimizing the effects of a deviating sub-process on the outcome of the process by determining sub-process metrics for downstream sub-processes that may compensate for the deviating sub-process.

A deviating sub-process comprises any sub-process that exhibits a sub-process metric that is outside of an acceptable range of values about a target value for the sub-process metric. The deviation may arise, for example, from a malfunction in the sub-process, an intentional change in the sub-process, and/or the inability of a sub-process, or process operator, to produce a sub-process metric within the acceptable range of values about a target value for the sub-process metric.

In one embodiment of the invention described in the preceding paragraphs, the invention further comprises setting a new target process metric(s) based on the sub-process metrics of the deviating sub-process. In another embodiment of the invention described in the preceding paragraph, the invention further comprises, (6) providing a map between the operational variables of a downstream sub-process and the metrics of that sub-process; (7) providing a cost function for the sub-process operational variables; and (8) determining values for the downstream sub-process operational variables that produce at the lowest cost the sub-process metric, and that are as close as possible to the compensating sub-process metric for that downstream sub-process.

In other aspects, the present invention provides systems adapted to practice the methods of the invention set forth above. In one embodiment, the system comprises a process monitor and a data processing device. The process monitor may comprise any device that provides information on process parameters and/or process metrics. The data processing device may comprise an analog and/or digital circuit configured to implement the functionality of one or more of the methods of the present invention using at least in part information provided by the process monitor. The information provided by the process monitor can be used directly to measure directly one or more metrics, operational variables, or both, associated with a process or sub-process. The information provided by the process monitor can also be used directly to train a non-linear regression model in the relationship between one or more of sub-process and process metrics, and sub-process metrics and sub-process operational variables (e.g., by using process parameter information as values for variables in an input vector and metrics as values for variables in a target output vector) or used to construct training data set for later use. In addition, in one embodiment, the systems of the present invention are adapted to conduct continual, on-the-fly training of the non-linear regression model.

In another embodiment, the system further comprises a process tool controller in electronic communication with the data processing device. The process tool controller may be any device capable of adjusting one or more process or sub-process operational variables in response to a control signal from the data processing device.

In some embodiments, the data processing device may implement the functionality of the methods of the present invention as software on a general purpose computer. In addition, such a program may set aside portions of a computer's random access memory to provide control logic that affects one or more of the measuring of metrics, the measuring of operational variables, the provision of target metric values, the provision of constraint sets, the prediction of metrics, the determination of metrics, the implementation of an optimizer, determination of operational variables, and detecting deviations of or in a metric. In such an embodiment, the program may be written in any one of a number of high-level languages, such as FORTRAN, PASCAL, C, C++, Tcl, or BASIC. Further, the program can be written in a script, macro, or functionality embedded in commercially available software, such as EXCEL or VISUAL BASIC. Additionally, the software can be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

In a further aspect, the present invention provides an article of manufacture where the functionality of a method of the present invention is embedded on a computer-readable medium, such as, but not limited to, a floppy disk, a hard disk, an optical disk, a magnetic tape, a PROM, an EPROM, CD-ROM, or DVD-ROM.

BRIEF DESCRIPTION OF THE DRAWINGS

A fuller understanding of the advantages, nature and objects of the invention may be had by reference to the following illustrative description, when taken in conjunction with the accompanying drawings. The drawings are not necessarily drawn to scale, and like reference numerals refer to the same items throughout the different views.

DETAILED DESCRIPTION

Figure 1:
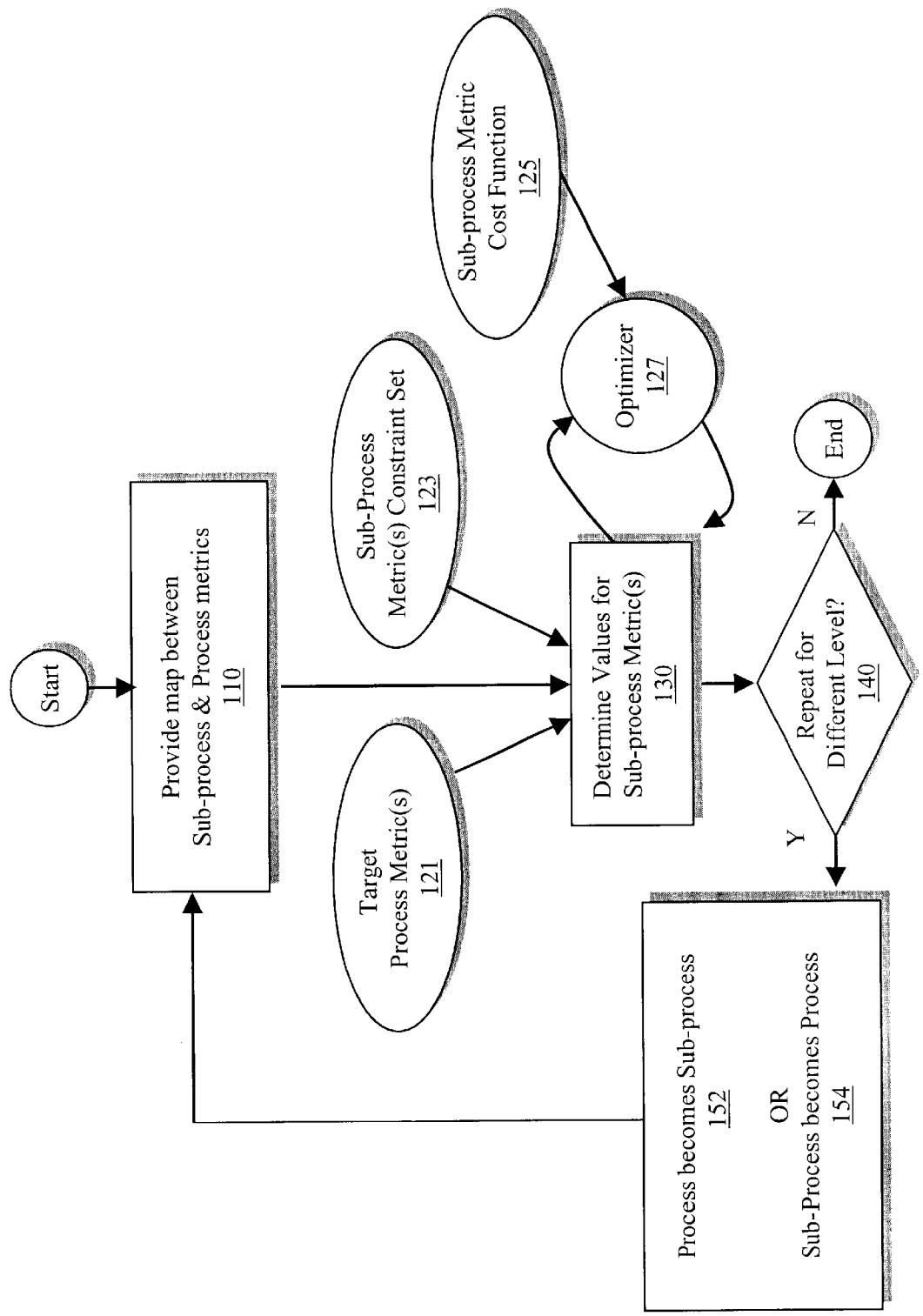
FIG. 1 is a flow diagram illustrating various embodiments of prediction and optimization of a process according to the present invention.

Referring to FIG. 1, a flow chart of various embodiments of a method of process optimization according to the present invention is shown. The method begins by providing a map between the metrics of a process and the metrics of two or more sub-processes 110 that define the process, one or more target process metrics 121, an acceptable range of values for the sub-process metrics to define a sub-process metric constraint set 123, and a cost function for the sub-process metrics 125. Preferably, the map is realized in the form of a nonlinear regression model trained in the relationship between the process metrics and sub-process metrics such that the nonlinear regression model can determine one or more predicted process metric values from one or more sub-process metric values. The process is optimized using the map 110 and an optimization model 127 to determine values for the sub-process metrics 130 that are within the constraint set, and that produce at the lowest cost a process metric(s) that is as close as possible to the target process metric(s) to define target sub-process metrics for each sub-process.

In one embodiment, the method of process optimization further comprises repeating the above optimization method at different hierarchical process levels ("YES" to query 140) where the process becomes the sub-process of the next repetition 152 or the sub-process becomes the process of the next repetition 154. In one version, the method may be repeated for the sub-sub-processes of one or more sub-processes. That is, the sub-process becomes the "process" of boxes 110–130 in FIG. 1 and the sub-sub-process becomes the "sub-process" of boxes 110–130. In another version of this embodiment, the method may be repeated for a higher-level process composed of two or more processes of the prior optimization. That is, the process becomes the "sub-process" of the new higher level process. In effect, the present invention may perform a hierarchical series of optimizations that can be scaled to any level of the overall production process.

Figure 2A:
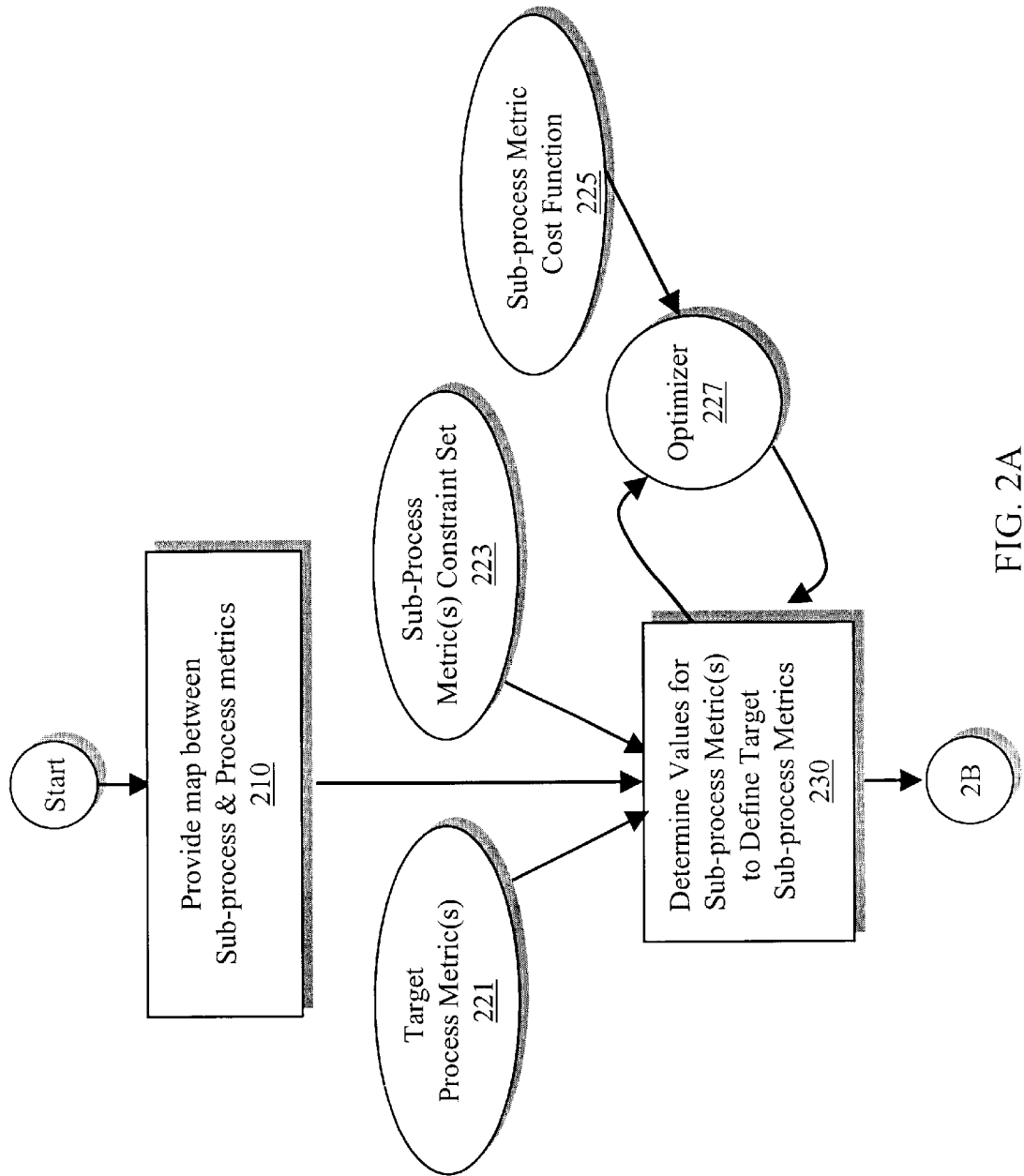
FIGS. 2A–2B are a flow diagram illustrating other various embodiment of prediction and optimization of a process according to the present invention.
Figure 2B:
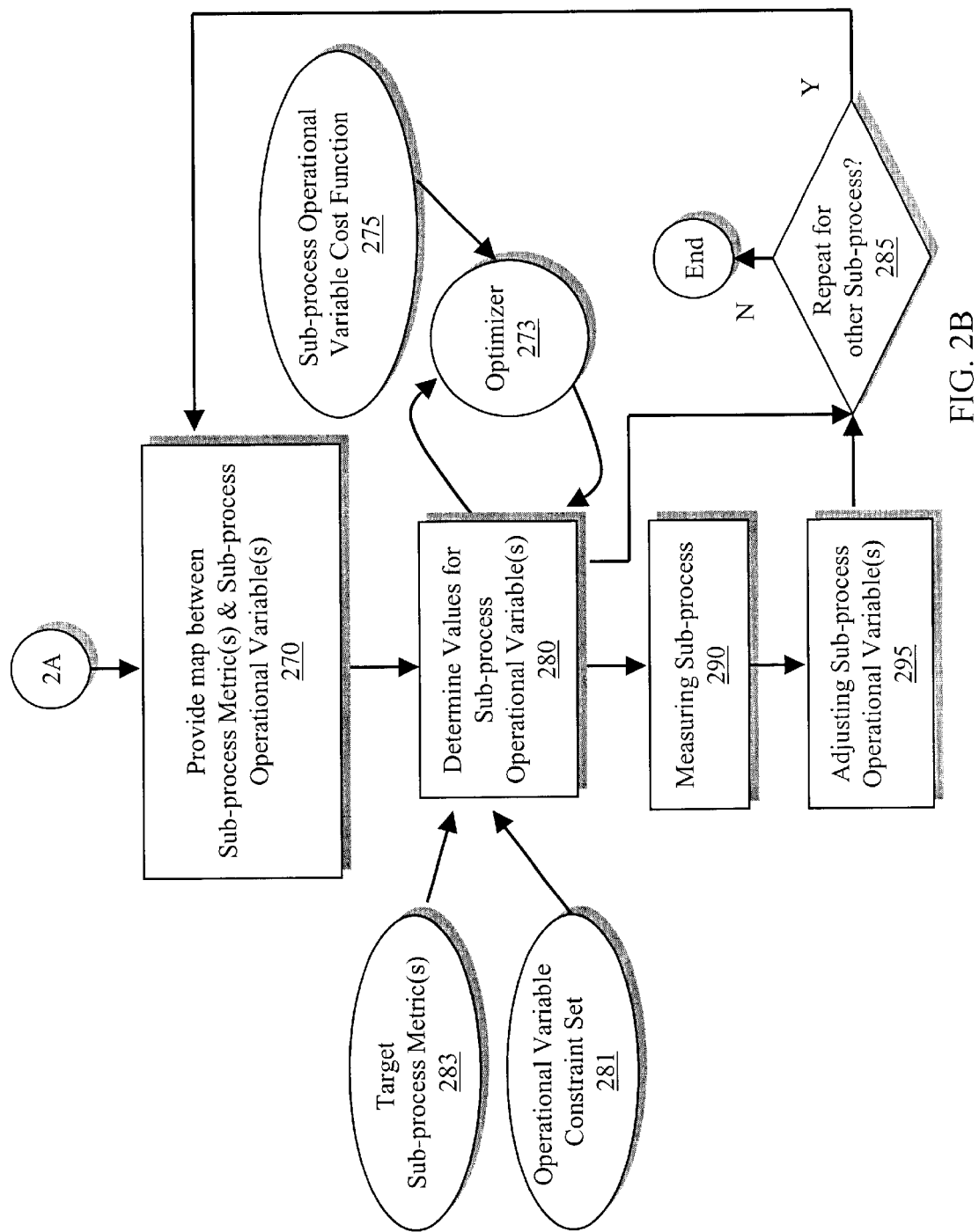

Referring to FIGS. 2A and 2B, in other embodiments, the method of process optimization comprises optimization of the process on two or more levels. The method begins by providing a map between the metrics of a process and the metrics of two or more sub-processes 210 defining the process, one or more target process metrics 221, an acceptable range of values for the sub-process metrics to define a sub-process metric constraint set 223, and a cost function for the sub-process metrics 225. Preferably, the map between one or more process and sub-process metrics is realized as a nonlinear regression model trained in the relationship between the process metrics and sub-process metrics such that the nonlinear regression model can determine one or more predicted process metric values from one or more sub-process metric values. The sub-process metrics are optimized using the map 210 and an optimization model 227 to determine values for the sub-process metrics that are within the sub-process metric constraint set 223, and that produce at the lowest cost a process metric(s) that is as close as possible to the target process metric(s) in order to define target sub-process metrics for each sub-process 230.

Referring to FIG. 2B, the method continues with providing a map between one or more sub-process metrics and one or more operational variables of the associated sub-process 270. Preferably, the map between one or more sub-process metrics and one or more sub-process operational variables comprises a nonlinear regression model trained in the relationship between the sub-process metrics and sub-process operational variables such that the nonlinear regression model can determine one or more predicted sub-process metric values from one or more sub-process operational variable values. The sub-process metric and operational variable map 270, an optimization model 273 and a provided operational variable cost function 275 are then used to determine target values for the sub-process operational variables 280 that are within an operational variable constraint set 281, that produce at the lowest cost the sub-process metric, and that are as close as possible to the target sub-process metric values 283.

In one embodiment, the optimization of sub-process operational variables is repeated ("YES" to query 285) for one or more sub-processes. In addition, in various embodiments, the optimization method may further comprise measuring one or more sub-process metrics, one or more sub-process operational variables, or both 290, and adjusting one or more of the sub-process operational variables substantially to its associated target value 295.

In all of the embodiments of the present invention, the map between process and sub-process metrics can be provided, for example, through the training of a nonlinear regression model against measured sub-process and process metrics. The sub-process metrics from each of the sub-processes serve as the input to a nonlinear regression model, such as a neural network. The output of the nonlinear regression model is the process metric(s). The nonlinear regression model is preferably trained by comparing a calculated process metric(s), based on measured sub-process metrics for an actual process run, with the actual process metric(s) as measured for the actual process run. The difference between calculated (i.e., predicted) and measured process metric(s), or the error, is used to compute the corrections to the adjustable parameters in the regression model. If the regression model is a neural network, these adjustable parameters are the connection weights between the layers of the neurons in the network.

In all of the embodiments of the present invention, the map between sub-process metrics and sub-process operational variables can be provided, for example, by determining the map through the training of a nonlinear regression model against measured sub-process metrics and sub-process operational variables. The sub-process operational variables from the sub-processes serves as the input to a nonlinear regression model, such as a neural network. The output of the nonlinear regression model is the sub-process metric(s). The nonlinear regression model is preferably trained by comparing a calculated sub-process metric(s), based on measured sub-process operational variables for an actual sub-process run, with the actual sub-process metric(s) as measured for the actual sub-process run. The difference between the calculated and measured sub-process metric(s), or the error, is used to compute the corrections to the adjustable parameters in the regression model. If the regression model is a neural network, these adjustable parameters are the connection weights between the layers of the neurons in the network.

In various embodiments, a nonlinear regression model for use in the present invention comprises a neural network. Specifically, in one version, the neural network model and training is as follows. The output of the neural network, r, is given by $$r_k = \sum_j \left[ W_{jk} \cdot \tanh\left( \sum_i W_{ij} \cdot x_i \right) \right].$$  Eq. (1)

This equation states that the $i^{th}$ element of the input vector x is multiplied by the connection weights $W_{ij}$. This product is then the argument for a hyperbolic tangent function, which results in another vector. This resulting vector is multiplied by another set of connection weights $W_{jk}$. The subscript i spans the input space (i.e., sub-process metrics). The subscript j spans the space of hidden nodes, and the subscript k spans the output space (i.e., process metrics). The connection weights are elements of matrices, and may be found, for example, by gradient search of the error space with respect to the matrix elements. The response error function for the minimization of the output response error is given by $$C = \left[ \sum_j (t - r)^2 \right]^{\frac{1}{2}} + \gamma \|W\|^2$$  Eq. (2)

The first term represents the root-mean-square ("RMS") error between the target t and the response r. The second term is a constraint that minimizes the magnitude of the connection weight W. If γ (called the regularization coefficient) is large, it will force the weights to take on small magnitude values. With this weight constraint, the response error function will try to minimize the error and force this error to the best optimal between all the training examples. The coefficient y thus acts as an adjustable parameter for the desired degree of the nonlinearity in the model.

In all of the embodiments of the present invention, the cost function can be representative, for example, of the actual monetary cost, or the time and labor, associated with achieving a sub-process metric. The cost function could also be representative of an intangible such as, for example, customer satisfaction, market perceptions, or business risk. Accordingly, it should be understood that it is not central to the present invention what, in actuality, the cost function represents; rather, the numerical values associated with the cost function may represent anything meaningful in terms of the application. Thus, it should be understood that the "cost" associated with the cost function is not limited to monetary costs.

The condition of lowest cost, as defined by the cost function, is the optimal condition, while the requirement of a metric or operational variable to follow defined cost functions and to be within accepted value ranges represents the constraint set. Cost functions are preferably defined for all input and output variables over the operating limits of the variables. The cost function applied to the vector z of n input and output variables at the nominal (current) values is represented as f(z) for $z \in \Re^n$.

For input and output variables with continuous values, a normalized cost value is assigned to each limit and an increasing piecewise linear cost function assumed for continuous variable operating values between limits. For variables with discrete or binary values, the cost functions are expressed as step functions.

In one embodiment, the optimization model (or method) comprises a genetic algorithm. In another embodiment, the optimization is as for Optimizer I described below. In another embodiment, the optimization is as for Optimizer II described below. In another embodiment, the optimization strategies of Optimization I are utilized with the vector selection and pre-processing strategies of Optimization II.

Optimizer I

In one embodiment, the optimization model is stated as follows:

Min (f(z))
$z \in \Re^n$
s.t. h(z)=a
$z^L < z < z^U$ where f: $\Re^n \rightarrow \Re$ and h: $\Re^n \rightarrow \Re^n$.

Vector z represents a vector of all input and output variable values, f(z), the objective function, and h(z), the associated constraint vector for elements of z. The variable vector z is composed of sub-process metric inputs, and process metric outputs. The vectors $z^L$ and $z^U$ represent the lower and upper operating ranges for the variables of z.

In one implementation, the optimization method focuses on minimizing the cost of operation over the ranges of all input and output variables. The procedure seeks to minimize the maximum of the operating costs across all input and output variables, while maintaining all within acceptable operating ranges. The introduction of variables with discrete or binary values requires modification to handle the yes/no possibilities for each of these variables.

The following basic notation is useful in describing this optimization model.

$m_1$=the number of continuous input variables.
$m_2$=the number of binary and discrete variables.
p=the number of output variables.
m=$m_1$+$m_2$, the total number of input variables.
$z^{m_1} \in \Re^{m_1}$=vector of $m_1$ continuous input variables.
$z^{m_2} \in \Re^{m_2}$=the vector of $m_2$ binary and discrete input variables.

$z^p \in \Re^p$=the vector of p continuous output variables.

Also let $$z \in \Re^n = [z^{m_1}, z^{m_2}, z^p]$$

the vector of all input variables and output variables for a given process run.

As mentioned above, two different forms of the cost function exist: one for continuous variables and another for the discrete and binary variables. In one embodiment, the binary/discrete variable cost function is altered slightly from a step function to a close approximation which maintains a small nonzero slope at no more than one point.

The optimization model estimates the relationship between the set of continuous input values and the binary/discrete variables $[z^{m_1}, z^{m_2}]$ to the output continuous values $[z^p]$. In one embodiment, adjustment is made for model imprecision by introducing a constant error-correction factor applied to any estimate produced by the model specific to the current input vector. The error-corrected model becomes, $$g'(z^{m_1}, z^{m_2}) = g(z^{m_1}, z^{m_2}) + e_0$$

where $e_0 = m_0 + g(z_0^{m_1}, z_0^{m_2})$.

$g(z^{m_1}, z^{m_2})$=the prediction model output based on continuous input variables.

g: $\Re^{m_1+m_2} \to \Re^p$ binary and discrete input variables.

$g(z_0^{m_1}, z_0^{m_2})$=the prediction model output vector based on current input variables.

$m_0 \in \Re^p$=the observed output vector for the current (nominal) state of inputs.

h(z)=the cost function vector of all input and output variables of a given process run record.

h(z(i))=the $i^{th}$ element of the cost function vector, for i=1, ..., m+p.

For the continuous input and output variables, cost value is determined by the piecewise continuous function. For the p continuous output variables $$[h(z(m+1)), h(z(m+2)), \ldots, h(z(m+p))] = g(z^{m_1}, z^{m_2}).$$

For h(z), the cost function vector for all the input and output variables of a given process run record, the scalar max h(z)=max{h(z(i)): i=1, 2, ..., m+p}, is defined as the maximum cost value of the set of continuous input variables, binary/discrete input variables, and output variables.

The optimization problem, in this example, is to find a set of continuous input and binary/discrete input variables which minimize h(z). The binary/discrete variables represent discrete metrics (e.g., quality states such as poor/good), whereas the adjustment of the continuous variables produces a continuous metric space. In addition, the interaction between the costs for binary/discrete variables, $h(z^{m_2})$, and the costs for the continuous output variables, $h(z^p)$, are correlated and highly nonlinear. In one embodiment, these problems are addressed by performing the optimization in two parts: a discrete component and continuous component. The set of all possible sequences of binary/discrete metric values is enumerated, including the null set. For computational efficiency, a subset of this set may be extracted. For each possible combination of binary/discrete values, a continuous optimization is performed using a general-purpose nonlinear optimizer, such as dynamic hill climbing or feasible sequential quadratic programming, to find the value of the input variable vector, $z_{opt}^m$, that minimizes the summed total cost of all input and output variables $$\min f(z) = \sum_{i=1}^{m+p} h(z_{opt}(i)).$$

Optimizer II

In another embodiment, a heuristic optimization method designed to complement the embodiments described under Optimizer I is employed. The principal difference between the two techniques is in the weighting of the input-output variable listing. Optimizer II favors adjusting the variables that have the greatest individual impacts on the achievement of target output vector values, e.g., the target process metrics. Generally, Optimizer II achieves the specification ranges with a minimal number of input variables adjusted from the nominal. This is referred to as the "least labor alternative." It is envisioned that when the optimization output of Optimizer II calls for adjustment of a subset of the variables adjusted using the embodiments of Optimizer I, these variables represent the principal subset involved with the achievement of the target process metric. The additional variable adjustments in the Optimization I algorithm may be minimizing overall cost through movement of the input variable into a lower cost region of operation.

In one embodiment, Optimization II proceeds as follows:

Min f(z)

$z \in \Phi$ s.t. h(z)=a $z^L \leq z \leq z^U$ where $\Phi = \{z^j \in \Re^n: j \leq s \in I;$ an s vector set$\}$.

f: $\Re^n \to \Re$ and h: $\Re^n \to \Re^n$.

The index j refers to the $j^{th}$ vector of a total of s vectors of dimension n=m+p, the total number of input plus output variables, respectively, which is included in the set to be optimized by f. The determination of s discrete vectors from an original vector set containing both continuous and binary/discrete variables may be arrived at by initial creation of a discrete rate change from nominal partitioning. For each continuous variable, several different rate changes from the nominal value are formed. For the binary variables only two partitions are possible. For example, a continuous variable rate-change partition of −0.8 specifies reduction of the input variable by 80% from the current nominal value. The number of valid rate partitions for the m continuous variables is denoted as $n_m$.

A vector z is included in $\Phi$ according to the following criterion. (The case is presented for continuous input variables, with the understanding that the procedure follows for the binary/discrete variables with the only difference that two partitions are possible for each binary variable, not $n_m$.) Each continuous variable is individually changed from its nominal setting across all rate partition values while the remaining m−1 input variables are held at nominal value. The p output variables are computed from the inputs, forming z.

Inclusion of z within the set of vectors to be cost-optimized is determined by the degree to which the output variables approach targeted values. The notation $z_{ik}(l) \in \Re$, l=1, 2, ... p, refers to the $l^{th}$ output value obtained when the input variable vector is evaluated at nominal variable values with the exception of the $i^{th}$ input variable which is evaluated at its $k^{th}$ rate partition. In addition, $z_{ik} \in \Re$ is the value of the $i^{th}$ input variable at its $k^{th}$ rate partition from nominal. The target value for the $l^{th}$ output variable l=1, 2, ... p is target (l) and the $l^{th}$ output variable value for the nominal input vector values is denoted $z_0$ (l).

The condition for accepting the specific variable at a specified rate change from nominal for inclusion in the optimization stage is as follows:

For each i≦m, and each k≦$n_m$ if $|(z_{ik}(l) - \text{target}(l))/(z_0(l) - \text{target}(l))| < K(l)$ for 1≦p, 0≦K(l)≦1, and $z^L \leq z_i^j \leq z^U$ then $z_{ik} \in \Delta_i$=acceptable rate partitioned values of the $i^{th}$ input variable.

To each set $\Delta_i$, i=1, ..., m is added the $i^{th}$ nominal value. The final set $\Phi$ of n-dimension vectors is composed of the crossing of all the elements of the sets $\Delta_i$ of acceptable input variable rate-partitioned values from nominal. Thus, the total number of vectors z∈$\Phi$ equals the product of the dimensions of the $\Delta_i$:

$$\text{Total vectors} \in \Phi = \left(\prod_i^{m_1} n_i\right) * (2^{m_2})$$

for $m_1$=the number of continuous input variables $m_2$=the number of binary and discrete variables.

The vector set $\Phi$ resembles a fully crossed main effects model which most aggressively approaches one or more of the targeted output values without violating the operating limits of the remaining output values.

This weighting strategy for choice of input vector construction generally favors minimal variable adjustments to reach output targets. In one embodiment, the Optimization II strategy seeks to minimize the weighted objective function $$f(z^j) = \sum_{i=1}^{m} f(z_i^j) + pV \left(\prod_{i=m+1}^{m+p} f(z_i^j)\right)^{1/p}$$

for pV. The last p terms of z are the output variable values computed from the n inputs. The term $$\left(\prod_{i=m+1}^{m+p} f(z_i^j)\right)^{1/p}$$

is intended to help remove sensitivity to large-valued outliers. In this way, the approach favors the cost structure for which the majority of the output variables lie close to target, as compared to all variables being the same mean cost differential from target.

Values of pV>>3 represent weighting the adherence of the output variables to target values as more important than adjustments of input variables to lower cost structures that result in no improvement in quality.

In another embodiment, the Optimization II method seeks to minimize the weighted objective function $$f(z^j) = \sum_{i=1}^{m} f(z_i^j) + V \left(\prod_{i=m+1}^{m+p} f(z_i^j)\right)$$

for V. The last p terms of z are the output variable values computed from the n inputs.

Figure 3:
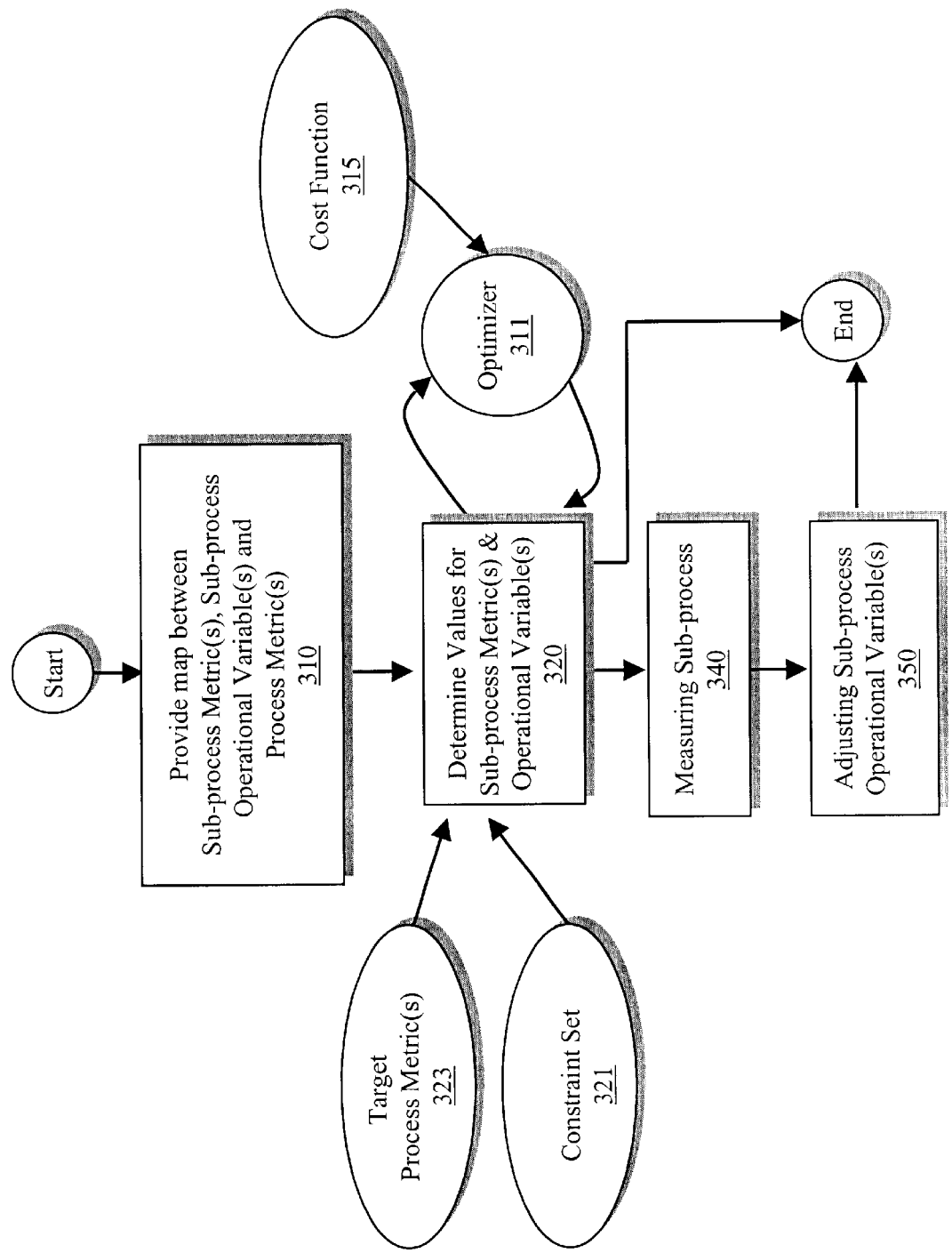
FIG. 3 is a flow diagram illustrating another embodiment of prediction and optimization of a process according to the present invention.

In another aspect, the method of the invention comprises optimization of parameters from two different levels of a process (e.g., sub-process metrics and sub-process operational variables) against a parameter of a higher level (e.g., process metrics). Referring to FIG. 3, in one embodiment, the method provides a map between one or more metrics and operational variables of a sub-process and one or more process metrics 310. Preferably, the map serves as a nonlinear regression model trained in the relationship between A (the sub-process metrics and sub-process operational variables) and B (the process metrics) such that the nonlinear regression model can determine one or more predicted process metric values from one or more sub-process metric and sub-process operational variable values.

The sub-process metric, operational variable and process metric map 310, an optimization model 311 and a provided operational-variable cost function 315 are then used to determine target values for the sub-process metrics and target values for the sub-process operational variables 320 that are within a sub-process metric and sub-process operational variable constraint set 321, that produce at the lowest cost the process metric, and that are as close as possible to the target process metric values 323.

In addition, in various embodiments, the optimization method may further comprise measuring one or more sub-process metrics, one or more sub-process operational variables, or both 340, and adjusting one or more of the sub-process operational variables substantially to its associated target value 350.

In all the embodiments of the invention, the map between sub-process metrics and sub-process operational variables and the process metrics can be provided, for example, by determining the map through the training of a nonlinear regression model against measured sub-process metrics, sub-process operational variables and process metrics. The sub-process metrics and operational variables serve as the input to a nonlinear regression model, such as a neural network. The output of the nonlinear regression model is the process metric(s). The nonlinear regression model is preferably trained by comparing a calculated process metric(s), based on measured sub-process metrics and operational variables for an actual process run, with the actual process metric(s) as measured for the actual process run. The difference between the calculated and measured process metric(s), or the error, is used to compute the corrections to the adjustable parameters in the regression model. If the regression model is a neural network, these adjustable parameters are the connection weights between the layers of the neurons in the network.

Figure 4A:
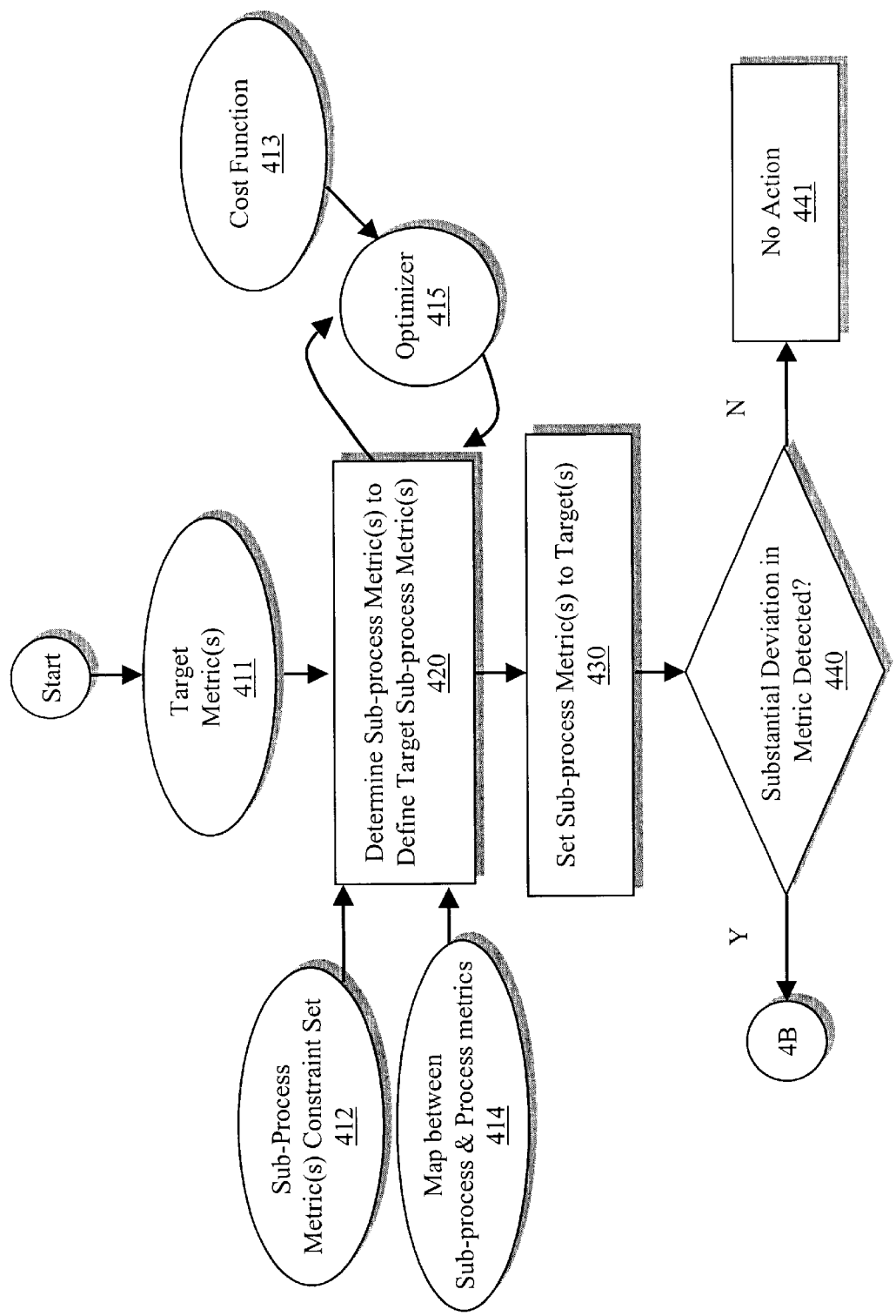
FIGS. 4A–4B are a flow diagram illustrating various embodiment of compensating for a deviating sub-process of a process according to the present invention.
Figure 4B:
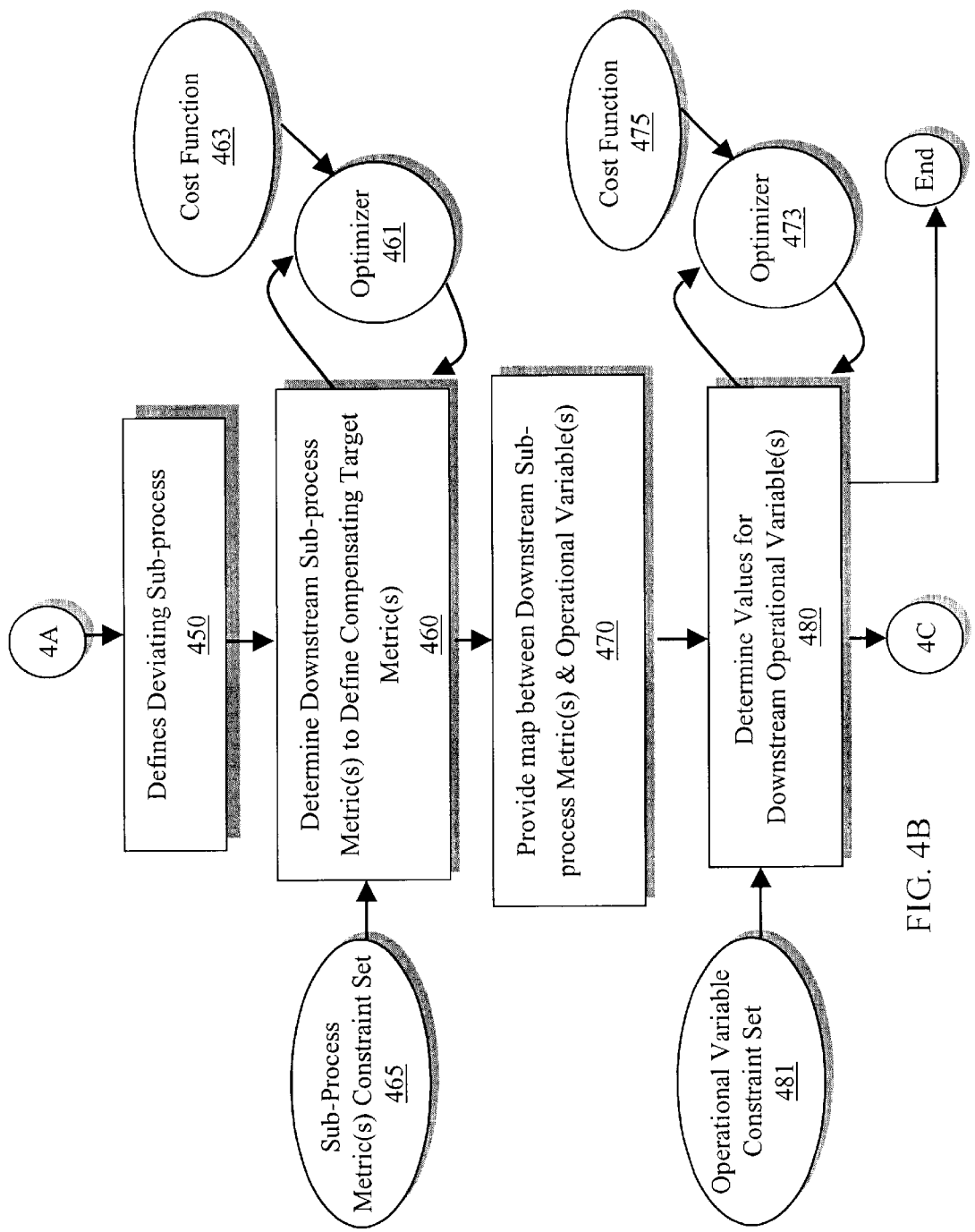
Figure 4C:
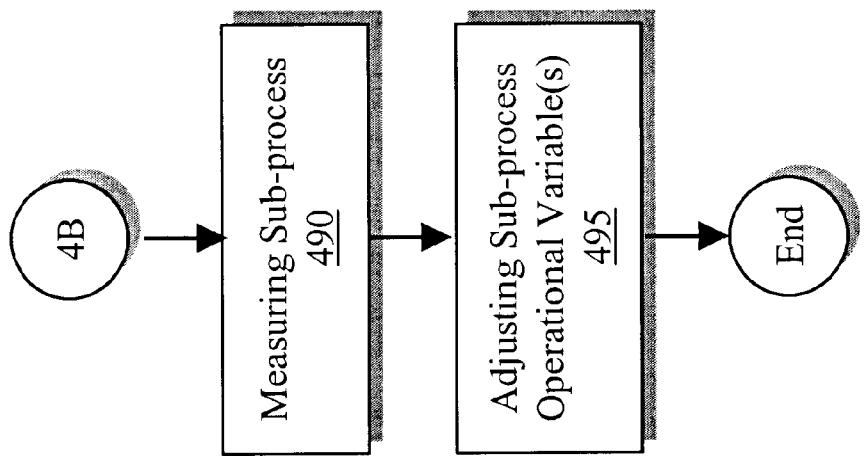

In another aspect, the provides a method of compensating for a deviating sub-process in a sequence of sub-process by determining sub-process metrics for one or more downstream sub-processes (i.e., sub-processes later in the process sequence than the deviating sub-process) that may compensate for the deviating sub-process. FIGS. 4A-4C illustrate various embodiments of this aspect of the invention are shown. In one embodiment, the method comprises providing one or more target process metrics 411, a sub-process metric constraint set 412, a cost function for the sub-process metrics 413, and a map between one or more sub-process metrics 414 and one or more process metrics, where the sub-process and process metric map 414 and an optimizer 415 are used to determine values for the sub-process metrics 420 that are within the constraint set 412, and that produce at the lowest cost a process metric(s) that is as close as possible to the target process metric(s) 411 to define a target sub-process metric for each sub-process 420. The method proceeds with setting the metrics of each sub-process as close as possible to its target metrics 430. Once the sub-process metrics are set, if a substantial deviation in a sub-process metric is detected ("YES" to query 440), further action is undertaken.

Referring to FIG. 4B, detection of a substantial deviation in a sub-process metric defines the sub-process as a deviating sub-process 450. A deviating sub-process is any sub-process that exhibits a sub-process metric outside an acceptable range of values about a target value for the sub-process metric. The deviation may arise, for example, from a malfunction in the sub-process, an intentional change in the sub-process, and/or the inability of a sub-process, or process operator, to produce a sub-process metric within the acceptable range of values about a target value for the sub-process metric.

Once a deviating sub-process is found, values for the sub-process metrics of one or more of the sub-processes downstream of the deviating sub-process 460 are determined using the map 414, an optimizer 461 and a provided cost function 463, to define compensating target sub-process metric values for the one or more downstream sub-processes 460 based on one or more deviating sub-process metrics, where the compensating target sub-process metric values 460 are within a sub-process metric constraint set 465 and produce at the lowest cost a process metric(s) that is as close as possible to the target process metric(s) 411.

The method continues with providing a map between one or more sub-process metrics and one or more operational variables of the associated downstream sub-process 470. The sub-process metric and operational variable map 470, an optimization model 473, and a provided operational variable cost function 475 are then used to determine target values for the downstream sub-process operational variables 480 that are within an operational variable constraint set 481, that produce at the lowest cost the sub-process metric, and that are as close as possible to the compensating target sub-process metric values.

In addition, in various embodiments, the optimization method may further comprise measuring one or more sub-process metrics, one or more sub-process operational variables, or both 490, and adjusting one or more of the sub-process operational variables substantially to its associated target value 495.

As in all embodiments of the invention, the map between one or more sub-process metrics and one or more sub-process operational variables preferably comprises a nonlinear regression model trained in the relationship between the sub-process metrics and sub-process operational variables such that the nonlinear regression model can determine one or more predicted sub-process metric values from one or more sub-process operational variable values. Similarly, the map between one or more sub-process metrics and one or more process metrics preferably comprises a nonlinear regression model trained in the relationship between the process metrics and sub-process metrics such that the nonlinear regression model can determine one or more predicted process metric values from one or more sub-process metric values.

Figure 5:
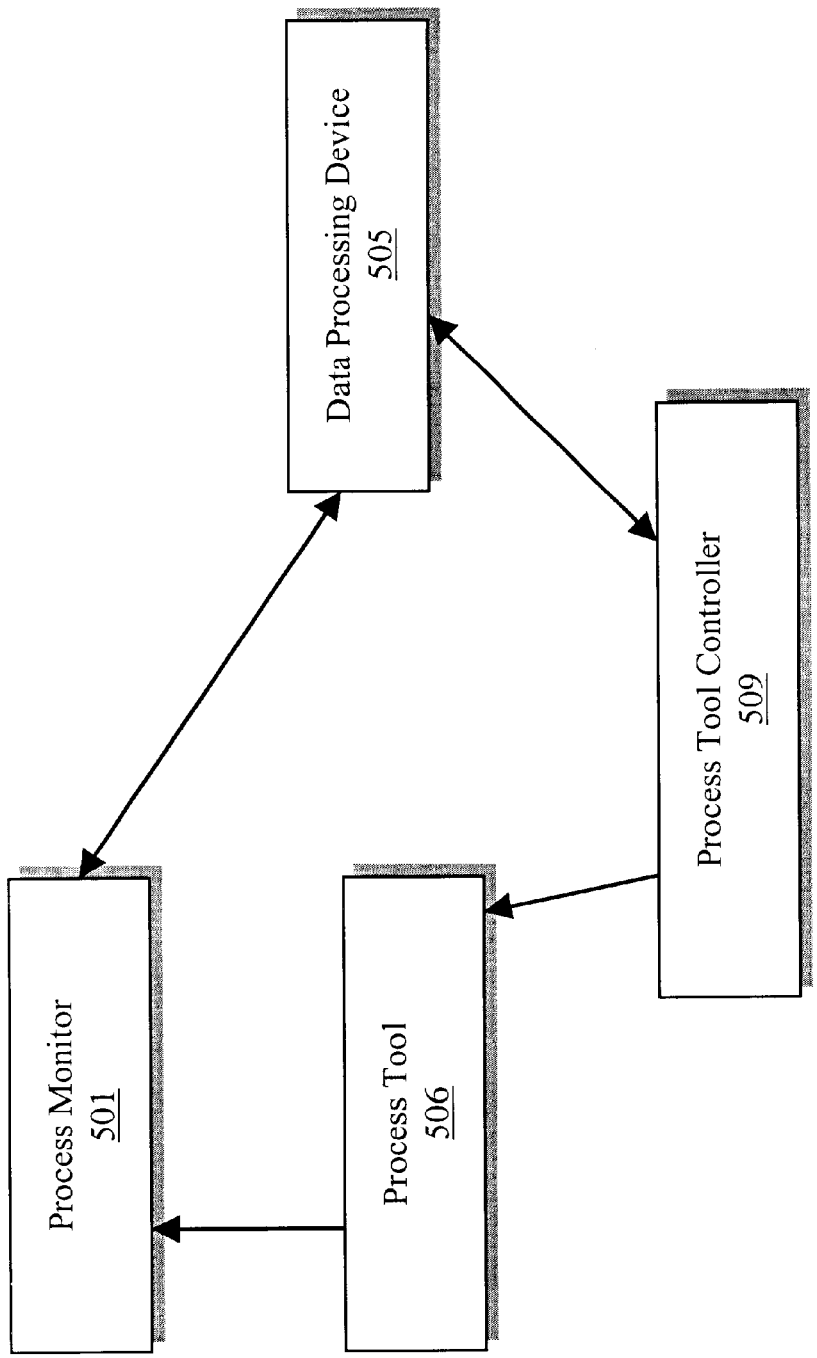
FIG. 5 is a schematic illustration of various embodiments of a system adapted to practice the methods of the present invention.

In other aspects, the present invention provides systems adapted to practice the methods of the invention set forth above. Referring to FIG. 5, in one embodiment, the system comprises a process monitor 501 in electronic communication with a data processing device 505. The process monitor may comprise any device that provides information on variables, parameters, or process metrics of a process or sub-process. For example, the process monitor may comprise a RF power monitor for a sub-process tool 506. The data processing device may comprise an analog and/or digital circuit adapted to implement the functionality of one or more of the methods of the present invention using at least in part information provided by the process monitor. The information provided by the process monitor can be used, for example, to directly measure one or more metrics, operational variables, or both, associated with a process or sub-process. The information provided by the process monitor can also be used directly to train a non-linear regression model, implemented using data processing device 505 in a conventional manner, in the relationship between one or more of sub-process and process metrics, and sub-process metrics and sub-process operational variables (e.g., by using process parameter information as values for variables in an input vector and metrics as values for variables in a target output vector) or used to construct training data set for later use. In addition, in one embodiment, the systems of the present invention are adapted to conduct continual, on-the-fly training of the non-linear regression model.

In another embodiment, the system further comprises a process tool controller 509 in electronic communication with the data processing device 505. The process tool controller may be any device capable of adjusting one or more process or sub-process operational variables in response to a control signal from the data processing device. The process controller may comprise mechanical and/or electromechanical mechanisms to change the operational variables. Alternatively, the process controller may simply comprise a display that alerts a human operator to the desired operational variable values and who in turn effectuates the change. For example, the process tool controller may comprise a circuit board that controls the RF power supply of a process tool 506.

In some embodiments, the data processing device may implement the functionality of the methods of the present invention as software on a general purpose computer. In addition, such a program may set aside portions of a computer's random access memory to provide control logic that affects one or more of the measuring of metrics, the measuring of operational variables, the provision of target metric values, the provision of constraint sets, the prediction of metrics, the determination of metrics, the implementation of an optimizer, determination of operational variables, and detecting deviations of or in a metric. In such an embodiment, the program may be written in any one of a number of high-level languages, such as FORTRAN, PASCAL, C, C++, Tcl, or BASIC. Further, the program can be written in a script, macro, or functionality embedded in commercially available software, such as EXCEL or VISUAL BASIC. Additionally, the software could be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

In another aspect, the present invention provides an article of manufacture where the functionality of a method of the present invention is embedded on a computer-readable medium, such as, but not limited to, a floppy disk, a hard disk, an optical disk, a magnetic tape, a PROM, an EPROM, CD-ROM, or DVD-ROM. The functionality of the method may be embedded on the computer-readable medium in any number of computer-readable instructions, or languages such as, for example, FORTRAN, PASCAL, C, C++, Tcl, BASIC and assembly language. Further, the computer-readable instructions can, for example, be written in a script, macro, or functionally embedded in commercially available software (such as, e.g., EXCEL or VISUAL BASIC).

EXAMPLE

Integrated Circuit Fabrication Metalization Process

An illustrative description of the invention in the context of a metalization process utilized in the production of integrated circuits is provided below. However, it is to be understood that the present invention may be applied to any integrated circuit production process including, but not limited to, plasma etch processes and via formation processes. More generally, it should be realized that the present invention is generally applicable to any complex multi-step production processes, such as, for example, circuit board assembly, automobile assembly and petroleum refining.

The following example pertains to a metalization layer process utilized during the manufacture of integrated circuits. Examples of input variables for a non-linear regression model of a metalization process or sub-process are listed in the following Table 1, and include sub-process operational variables "process variables" and "maintenance variables" columns, and sub-process metrics, "metrology variables" column. Examples of output variables for a non-linear regression model of a metalization process or sub-process are also listed in Table 1, which include sub-process metrics, "metrology variables" column, and process metrics "yield metric" column.

TABLE 1

| | input variables | | output variable |
|---|---|---|---|
| process variables | maintenance variables | metrology variables | yield metric |
| cvd tool id | cvd tool mfc1 | cvd control wafer | via chain resistance |
| cvd tool pressure | cvd tool mfc2 | cmp control wafer | |
| cvd tool gas flow | cvd tool mfc3 | cmp product wafer | |
| cvd tool termperature | cvd tool electrode | litho/pr control wafer | |
| cvd tool . . . | cvd tool up time | litho/pr product wafer | |
| cmp tool id | cmp tool pad | etch control wafer | |
| cmp tool speed | cmp tool slurry | etch product wafer | |
| cmp tool slurry | cmp pad moter | | |
| cmp tool temperature | cmp calibration | | |
| cmp tool . . . | cmp tool up time | | |
| litho tool id | litho tool lamp | | |
| litho tool x,y,z | litho tool calibration | | |
| litho tool . . . | litho tool up time | | |
| etch tool id | etch tool electrode | | |
| etch tool pressure | etch tool mfc1 | | |
| etch tool rf power | etch tool mfc2 | | |
| etch tool gas flow | etch tool clamp ring | | |
| etch tool temperature | etch tool rf match box | | |
| etch tool . . . | etch tool up time | | |

Prior to the first layer of metalization, the transistors 601 are manufactured and a first level of interconnection 603 is prepared. This is shown schematically in FIG. 6. The details of the transistor structures and the details of the metal runners (first level of interconnect) are not shown.

The first step in the manufacture of integrated circuits is typically to prepare the transistors 601 on the silicon wafer 605. The nearest neighbors that need to be connected are then wired up with the first level of interconnection 603. Generally, not all nearest neighbors are connected; the connections stem from the circuit functionality. After interconnection, the sequential metalization layers, e.g., a first layer 607, a second layer 609, a third layer 611, etc., are fabricated where the metalization layers are separated by levels of oxide 613 and interconnected by vias 615.

Figure 7:
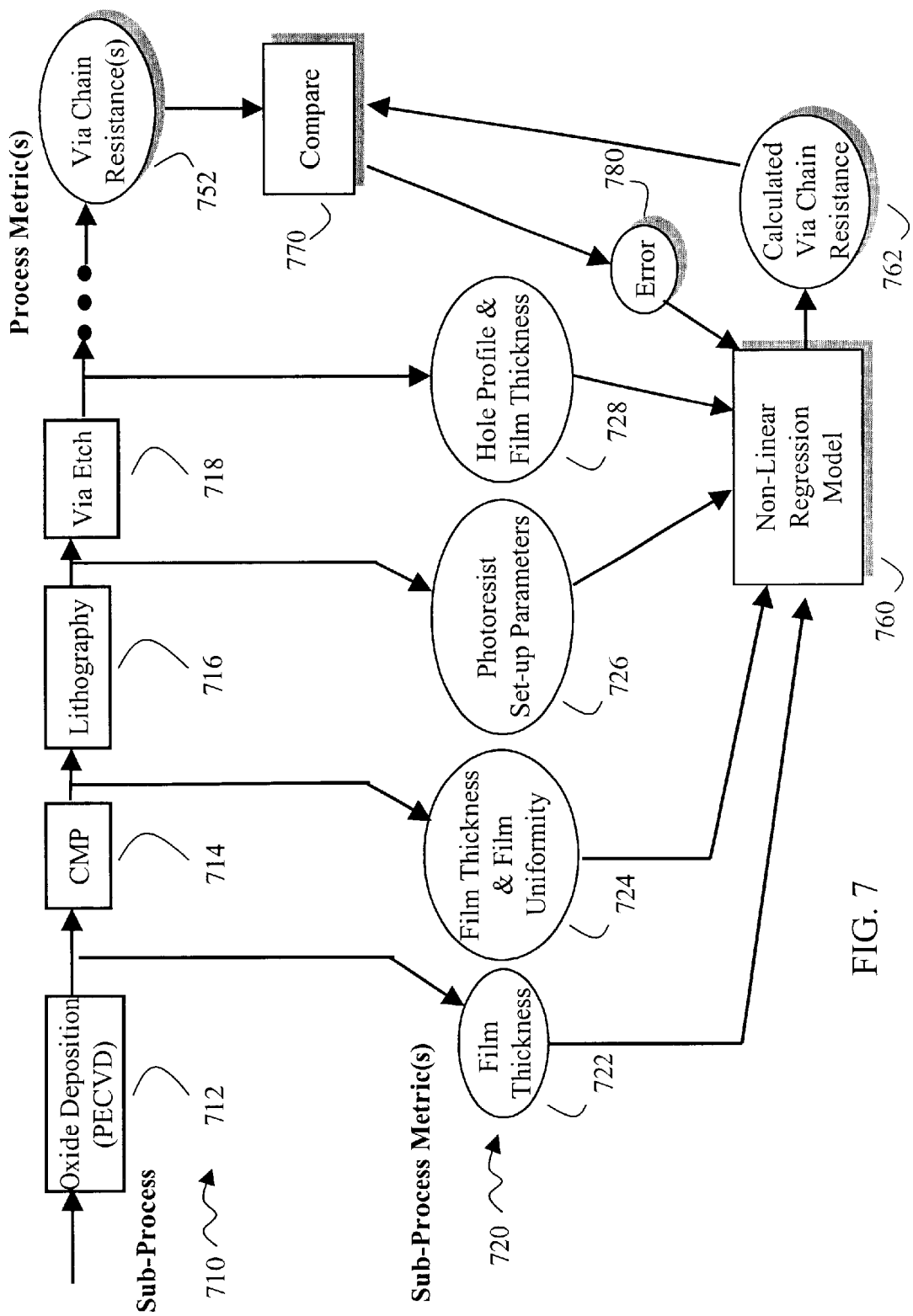
FIGS. 7 is a schematic illustration of four sequential processing steps associated with manufacturing a metal layer and non-linear regression model training according to various embodiments of the present invention.

FIG. 7 schematically illustrates four sequential processing steps 710, i.e., sub-processes, that are associated with manufacturing a metal layer (i.e., the metalization layer process). These four processing steps are: (1) oxide deposition 712; (2) chemical mechanical planerization 714; (3) lithography 716; and (4) via etch 718. Also illustrated are typical associated sub-process metrics 720.

Oxide deposition, at this stage in integrated circuit manufacture, is typically accomplished using a process known as PECVD (plasma-enhanced chemical vapor deposition), or simply CVD herein. Typically, during the oxide deposition sub-process 712 a blank monitor wafer (also known as a blanket wafer) is run with each batch of silicon wafers. This monitor wafer is used to determine the amount of oxide deposited on the wafer. Accordingly, on a lot to lot basis there are typically one or more monitor wafers providing metrology data (i.e., metrics for the sub-process) on the film thickness, as grown, on the product wafer. This film thickness 722 is a metric of the oxide-deposition sub-process.

After the oxide-deposition sub-process, the wafers are ready for the chemical mechanical planarization ("CMP") processing step 714. This processing step is also referred to as chemical mechanical polishing. CMP is a critical sub-process because after the growth of the oxide, the top surface of the oxide layer takes on the underlying topology. Generally, if this surface is not smoothed the succeeding layers will not match directly for subsequent processing steps. After the CMP sub-process, a film thickness may be measured from a monitor wafer or, more commonly, from product wafers. Frequently, a measure of the uniformity of the film thickness is also obtained. Accordingly, film thickness and film uniformity 724 are in this example the metrics of the CMP sub-process.

Following the CMP sub-process is the lithography processing step 716, in which a photoresist is spun-on the wafer, patterned, and developed. The photoresist pattern defines the position of the vias, i.e., tiny holes passing directly through the oxide layer. Vias facilitate connection among transistors and metal traces on different layers. This is shown schematically in FIG. 6. Typically, metrics of the lithography sub-process may include the photoresist set-up parameters 726.

The last sub-process shown in FIG. 7 is the via etch sub-process 718. This is a plasma etch designed to etch tiny holes through the oxide layer. The metal interconnects from layer to layer are then made. After the via etch, film thickness measurements indicating the degree of etch are typically obtained. In addition, measurements of the diameter of the via hole, and a measurement of any oxide or other material in the bottom of the hole, may also be made. Thus, in this example, two of these measurements, film thickness and via hole profile 728, are used as the via etch sub-process metrics.

Not shown in FIG. 7 (or FIG. 8) is the metal deposition processing step. The metal deposition sub-process comprises sputter deposition of a highly conductive metal layer. The end result can be, for example, the connectivity shown schematically in FIG. 6. (The metal deposition sub-process is not shown to illustrate that not every sub-process of a given process need be considered to practice and obtain the objectives of the present invention. Instead, only a certain subset of the sub-processes may be used to control and predict the overall process.)

Each metal layer is prepared by repeating these same sub-process steps. Some integrated microelectronic chips contain six or more metal layers. The larger the metal stack, the more difficult it is to manufacture the devices.

When the wafers have undergone a metalization layer process, they are typically sent to a number of stations for testing and evaluation. Commonly, during each of the metalization layer processes there are also manufactured on the wafer tiny structures known as via-chain testers or metal-to-metal resistance testers. The via chain resistance 752 measured using these structures represents the process metric of this example. This process metric, also called a yield metric, is indicative of the performance of the cluster of processing steps, i.e., sub-processes. Further, with separate via-chain testers for each metalization layer process, the present invention can determine manufacturing faults at individual clusters of sub-processes.

In one embodiment, the sub-process metrics from each of the sub-processes (processing steps) become the input to a nonlinear regression model 760. The output for this model is the calculated process metric 762; in the present example, this is the via-chain resistance. The nonlinear regression model is trained as follows.

The model calculates a via-chain resistance 762 using the input sub-process metrics 720. The calculated via chain resistance 762 is compared 770 with the actual resistance 752 as measured during the wafer-testing phase. The difference, or the error, 780 is used to compute corrections to the adjustable parameters in the regression model 760. The procedure of calculation, comparison, and correction is repeated with other training sets of input and output data until the error of the model reaches an acceptable level. An illustrative example of such a training scheme is shown schematically in FIG. 7.

Figure 8:
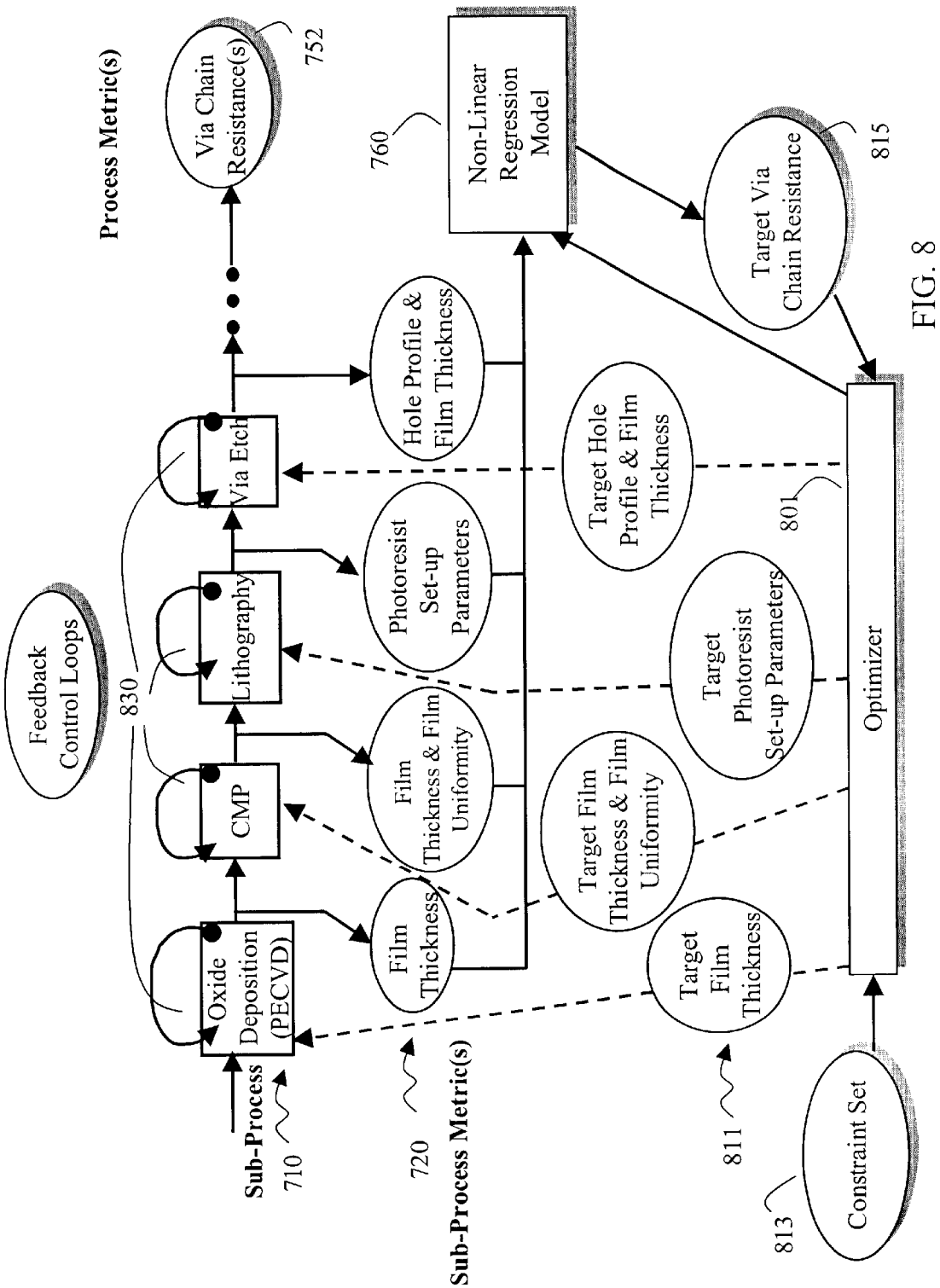
FIG. 8 is a schematic illustration of four sequential processing steps associated with manufacturing a metal layer and a schematic illustration of process prediction and optimization according to various embodiments of the present invention.

After the nonlinear regression model, or neural network, is trained it is ready for optimization of the sub-process metrics. FIG. 8 schematically illustrates the optimization of the sub-process metrics 720 with an "optimizer" 801. The optimizer 801 operates according to the principles hereinabove described, determining target sub-process metrics 811 that are within the constraint set 813 and are predicted to achieve a process metric(s) as close to the target process metric(s) 815 as possible while maintaining the lowest cost feasible. The optimization procedure begins by setting an acceptable range of values for the sub-process metrics to define a sub-process metric constraint set 813 and by setting one or more target process metrics 815. The optimization procedure then optimizes the sub-process metrics against a cost function for the sub-process metrics.

For example, in the metalization layer process, the constraint set 813 could comprise minimum and maximum values for the oxide deposition film thickness metric, the CMP film thickness and film uniformity metrics, the lithography photoresist set up parameters, and the via etch hole profile and film thickness metrics. The target process metric, via chain resistance 815, is set at a desired value, e.g., zero. After the nonlinear regression model 760 is trained, the optimizer 801 is run to determine the values of the various sub-process metrics (i.e., target sub-process metrics 811) that are predicted to produce a via chain resistance as close as possible to the target value 815 (i.e., zero) at the lowest cost.

Referring to FIG. 8, in another embodiment, an additional level of prediction and control is employed. This additional level of prediction and control is illustrated in FIG. 8 by the loop arrows labeled "feedback control loop" 830. In one such embodiment, a map is determined between the operational variables of a sub-process and the metrics of that sub-process, and a cost function is provided for the sub-process operational variables. Employing the map and cost function, values for the sub-process operational variables are determined that produce at the lowest cost the sub-process metric, and that are as close as possible to the target sub-process metric values, to define target operational variables. In another embodiment, an acceptable range of values for the sub-process operational variables is identified to define a sub-process operational variable constraint set, and the operational variables are then optimized such that the target operational variables fall within the constraint set.

In one embodiment, the optimization method comprises a genetic algorithm. In another embodiment, the optimization is as for Optimizer I described above. In another embodiment, the optimization is as for Optimizer II described above. In yet another embodiment, the optimization strategies of Optimization I are utilized with the vector selection and pre-processing strategies of Optimization II.

Figure 9:
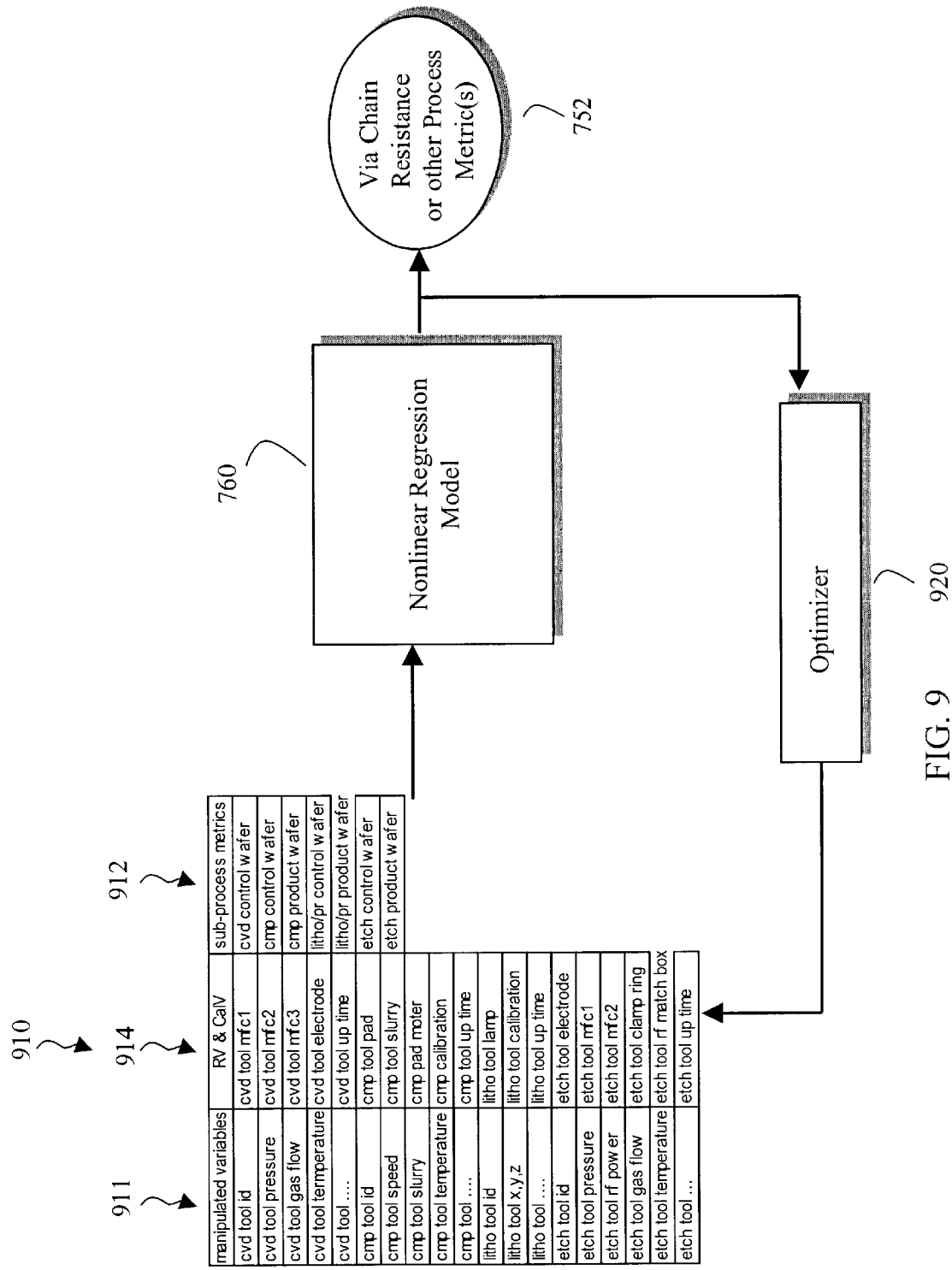
FIG. 9 is a schematic illustration of determining a map between sub-process metrics and sub-process operational variables according to various embodiments of the present invention.

FIG. 9 schematically illustrates an embodiment of the invention, in the context of the present metalization layer process example, that comprises determining a map between the sub-process metrics and sub-process operational variables and the process metrics using a nonlinear regression model. As illustrated, the input variables 910 to the nonlinear regression model 760 comprise both process metrics 912 and sub-process operational variables 914, 916.

FIG. 9 further illustrates that in this embodiment, the optimizer 920 acts on both the sub-process metrics and operational parameters to determine values for the sub-process metrics and operational variables that are within the constraint set, and that produce at the lowest cost a process metric(s) 752 that is as close as possible to the a target process metric(s) to define target sub-process metrics and target operational variables for each sub-process.

Figure 6:
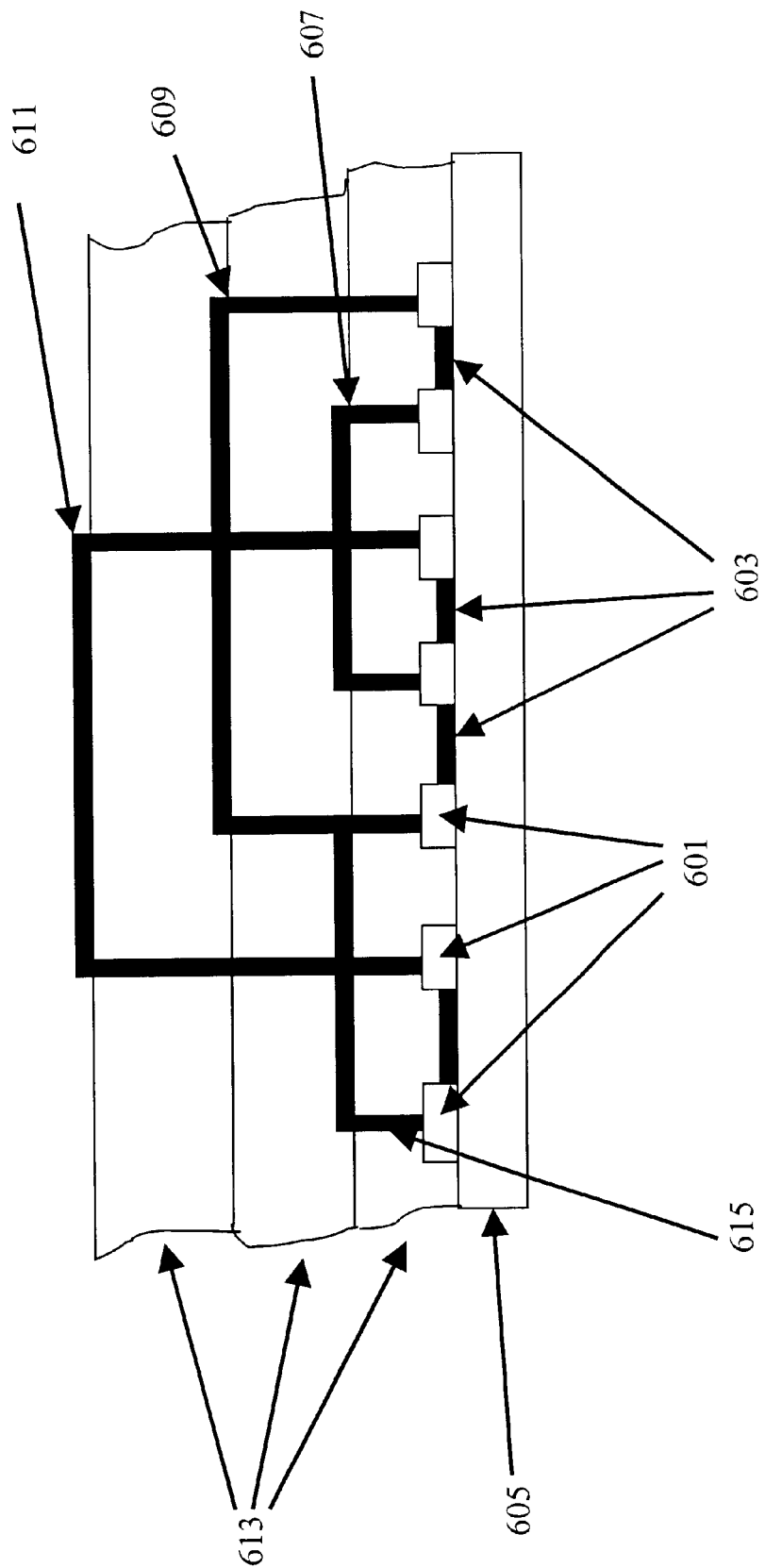
FIG. 6 is a schematic illustration of an illustrative structure produced by a metalization process, where the details of the transistor structures and metal runners (first level of interconnect) are not shown.
Figure 10:
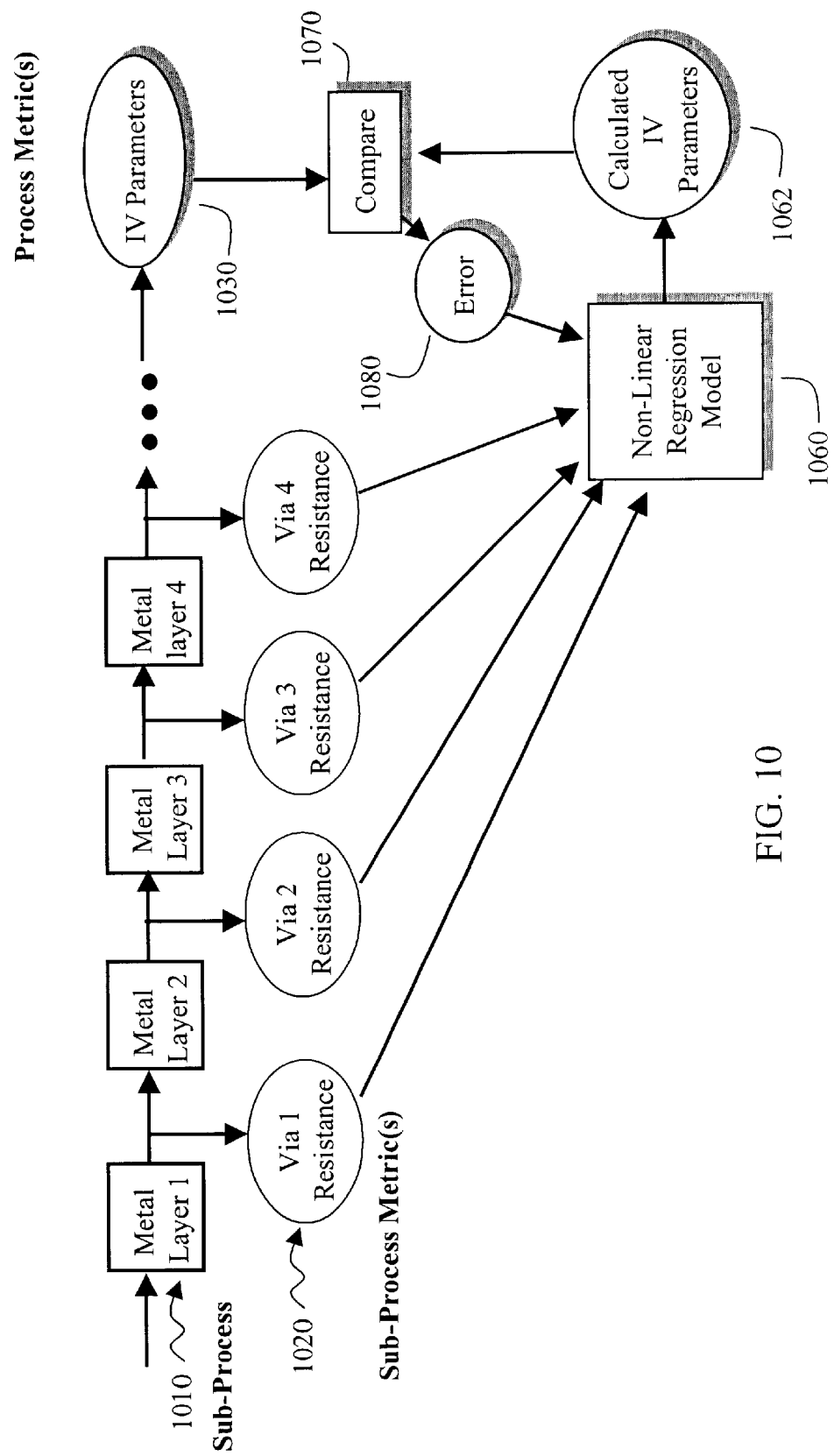
FIG. 10 is a schematic illustration of a hierarchical series of sub-process and process models and a schematic illustration of process prediction according to various embodiments of the present invention.
Figure 11:
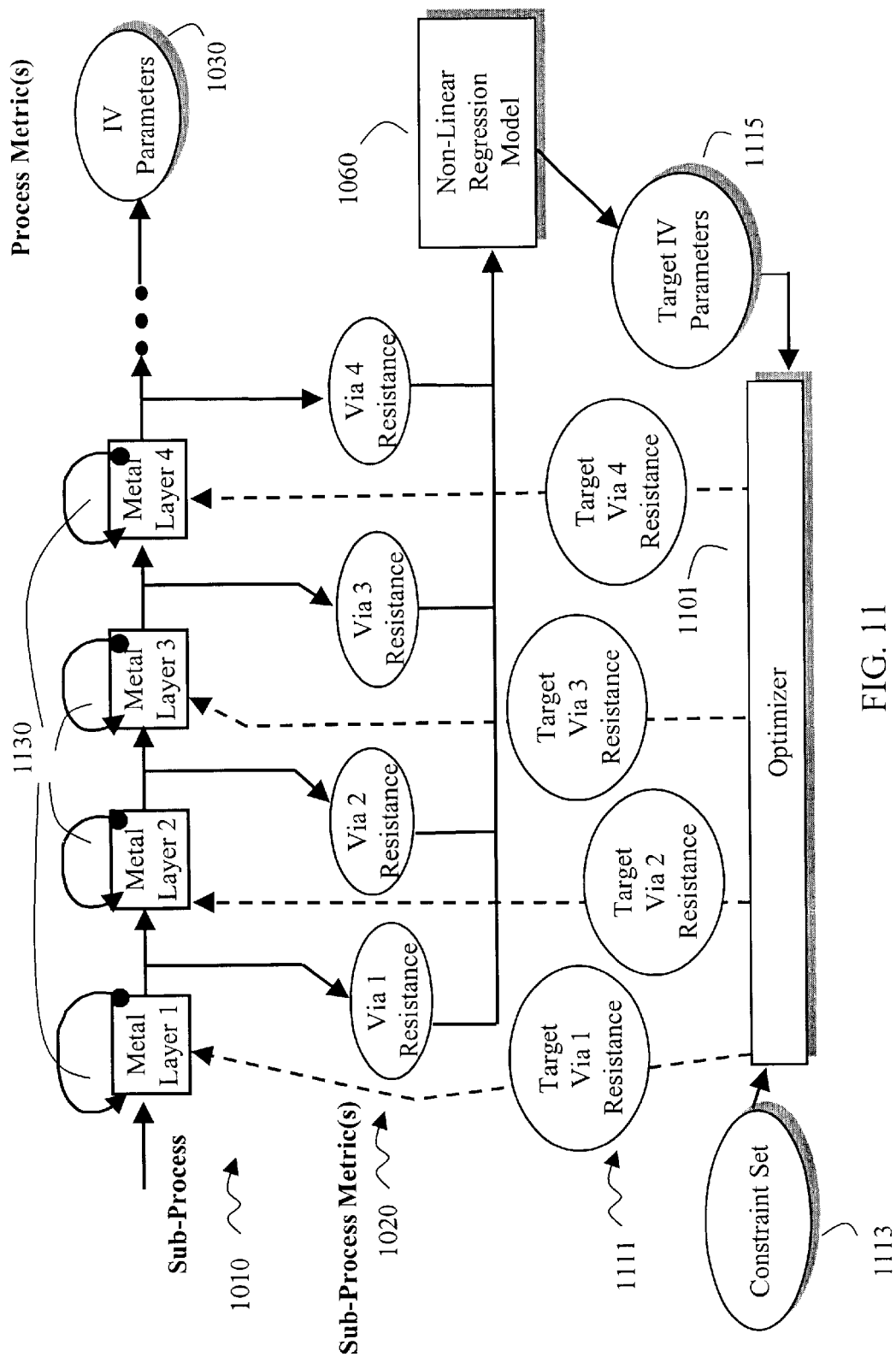
FIG. 11 is a schematic illustration of a hierarchical series of sub-process and process models and a schematic illustration of process optimization according to various embodiments of the present invention.

Referring to FIGS. 10 and 11, and the metalization layer process described above, one embodiment of the present invention comprises a hierarchical series of sub-process and process models. As seen in FIG. 6, there are several levels of metalization. As illustrated in FIG. 10, a new model is formed where each metalization layer process performed, such as illustrated in FIGS. 7 and 8, becomes a sub-process 1010 in a new higher level process, i.e., complete metalization in this example. As illustrated in FIGS. 10 and 11, the sub-process metrics 1020 are the via chain resistances of a given metalization layer process, and the process metrics of the complete metalization process are the IV (current-voltage) parameters 1030 of the wafers. FIG. 10 provides an illustrative schematic of training the nonlinear regression model 1060 for the new higher level process, and FIG. 11 illustrates its use in optimization.

Referring to FIG. 10, the nonlinear regression model 1060 is trained in the relationship between the sub-process metrics 1020 and process metric(s) 1030 in a manner analogous to that illustrated in FIG. 7. The sub-process metrics 1020 from each of the sub-processes 1010 (here metalization steps) become the input to the nonlinear regression model 1060. The output for this model is the calculated process metrics 1062; in the present example, these are the IV parameters. The nonlinear regression model is trained as follows.

The model calculates IV parameters 1062 using the input sub-process metrics 1020. The calculated IV parameters 1062 are compared as indicated at 1070 with the actual IV parameters as measured during the wafer-testing phase 1030. The difference, or the error, 1080 is used to compute corrections to the adjustable parameters in the regression model 1060. The procedure of calculation, comparison, and correction is repeated with other training sets of input and output data until the error of the model reaches an acceptable level.

Referring again to FIG. 11, after the nonlinear regression model, or neural network, 1060 is trained it is ready for optimization of the sub-process metrics 1020 in connection with an "optimizer" 1101. The optimizer 1101 determines target sub-process metrics 1111 that are within the constraint set 1113 and are predicted to achieve a process metric(s) as close to the target process metric(s) 1115 as possible while maintaining the lowest cost feasible. The optimization procedure begins by setting an acceptable range of values for the sub-process metrics to define a sub-process metric constraint set 1113 and by setting one or more target process metrics 1115. The optimization procedure then optimizes the sub-process metrics against a cost function for the sub-process metrics.

For example, in the overall metalization process, the constraint set 1113 may comprise minimum and maximum values for the via chain resistances of the various metal layers. The target process metric, IV parameters, 1115 are set to desired values and the optimizer 1101 is run to determine the values of the various sub-process metrics (i.e., target sub-process metrics 1111) that are predicted to produce IV parameters as close as possible (e.g., in a total error sense) to the target value 1115 at the lowest cost.

In another embodiment, an additional level of prediction and control is employed. This additional level of prediction and control is illustrated in FIG. 11 by the feedback control loop arrows 1130. In one such embodiment, a map is determined between the operational variables of a sub-process and the metrics of that sub-process, and a cost function is provided for the sub-process operational variables, which in this example may also be the operational variables of a sub-sub-process. Employing the map and cost function, values for the sub-process operational variables are determined that produce at the lowest cost the sub-process metric, and that are as close as possible to the target sub-process metric values, to define target operational variables. In another embodiment, an acceptable range of values for the sub-process operational variables is identified to define a sub-process operational variable constraint set, and the operational variables are then optimized such that the target operational variables fall within the constraint set.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of optimization of a process having an associated metric and comprising a plurality of sub-processes, the method comprising the steps of:
   (a) providing a target metric value for the process;
   (b) providing one or more ranges of acceptable values for the sub-process metrics to define a constraint set;
   (c) providing a nonlinear regression model that has been trained in the relationship between the sub-process metrics and the process metric such that the nonlinear regression model can determine a predicted process metric value from the measured sub-process metric values; and
   (d) using the nonlinear regression model and an optimizer to determine values for the sub-process metrics within the constraint set that produce at a substantially lowest cost a predicted process metric value substantially as close as possible to the target process metric value.

2. The method of claim 1, further comprising the step of:
   repeating steps (a)–(d) for a sub-process of the process, wherein said sub-process becomes the process and one or more sub-sub-processes of said sub-process become the sup-processes of steps (a)–(d).

3. The method of claim 1, further comprising the step of:
   repeating steps (a)–(d) for a higher level process of comprising a plurality of the processes of claim 1, wherein said higher level process becomes the process and one or more of the plurality of the processes of claim 1 become the sup-processes of steps (a)–(d).

4. The method of claim 1, wherein the optimizer associates costs with at least one of the sub-process metrics.

5. The method of claim 1, further comprising the steps of:
   (e) providing one or more target sub-process metric values for a sub-process, the target sub-process metric values producing at a substantially lowest cost a predicted process metric value substantially as close as possible to the target process metric value;
   (f) providing one or more ranges of acceptable values for the sub-process operational variables to define an operational variable constraint set;
   (g) providing a nonlinear regression model that has been trained in the relationship between the sub-process operational variables and the sub-process metrics of said sub-process such that the nonlinear regression model can determine a predicted sub-process metric value for said sub-process from the sub-process operational variable values; and
   (h) using the nonlinear regression model and an optimizer to determine target values for the sub-process operational variables within the operational variable constraint set that produce at a substantially lowest cost a predicted sub-process metric for said sub-process as close as possible to the target sub-process metric for said sub-process.

6. The method of claim 5, further comprising the step of:
   repeating steps (e)–(h) for another sub-process of the process.

7. The method of claim 5, wherein the optimizer associates costs with at least one of the sub-process operational variables.

8. The method of claim 5, further comprising the steps of:
   (i) measuring at least one of one or more sub-process metrics and one or more sub-process operational variables; and
   (j) adjusting one or more sub-process operational variables as close as possible to a target value for the sub-process operational variable.

9. The method of claim 8, further comprising the step of:
   repeating steps (i)–(j) for another sub-process of the process.

10. An article of manufacture having a computer-readable medium with computer-readable instructions embodied thereon for performing the method of claim 5.

11. The method of claim 1, wherein the action of providing of at least one of steps (a) and (b) comprises measuring.

12. An article of manufacture having a computer-readable medium with computer-readable instructions embodied thereon for performing the method of claim 1.

13. A method of optimization of a process having an associated metric and comprising a plurality of sub-processes, the method comprising the steps of:
(a) providing a target metric value for the process;
(b) providing one or more ranges of acceptable values for the sub-process metrics and the sub-process operational variables to define a sub-process constraint set;
(c) providing a nonlinear regression model that has been trained in the relationship between the sub-process metrics and sub-process operational variables and the process metric such that the nonlinear regression model can determine a predicted process metric value from the measured sub-process metric and operational variable values; and
(d) using the nonlinear regression model and an optimizer to determine values for the sub-process metrics and the sub-process operational variables within the sub-process constraint set that produce at a substantially lowest cost a predicted process metric substantially as close as possible to the target process metric.

14. The method of claim 13, wherein the optimizer associates costs with at least one of the sub-process metrics and at least one of the sub-process operational variables.

15. The method of claim 13, further comprising the step of:
repeating steps (a)–(d) for another sub-process of the process.

16. The method of claim 13, further comprising the steps of:
(e) measuring at least one of one or more sub-process metrics and one or more sub-process operational variables; and
(f) adjusting one or more sub-process operational variables as close as possible to a target value for the sub-process operational variable.

17. The method of claim 15, further comprising the step of:
repeating steps (e)–(f) for another sub-process of the process.

18. An article of manufacture having a computer-readable medium with computer-readable instructions embodied thereon for performing the method of claim 13.

19. A method of compensating for sub-process deviation from an acceptable range about a target metric, the method comprising the steps of:
(a) providing a target metric value for a metric associated with a process, the process comprising a sequence of sub-processes;
(b) providing a target sub-process metric value for a metric associated with a sub-process of the process;
(c) providing one or more ranges of acceptable values for the sub-process metrics to define a constraint set;
(d) detecting a substantial deviation in at least one sub-process metric value of one sub-process from the target sub-process metric value for said sub-process that defines a deviating sub-process;
(e) providing a nonlinear regression model that has been trained in the relationship between the sub-process metrics and the process metric such that the nonlinear regression model can determine a predicted process metric value based on the sub-process metric value of the deviating sub-process; and
(f) using the nonlinear regression model and an optimizer to determine values for the sub-process metrics of sub-processes that are later in the process sequence than the deviating sub-process, wherein said values are within the constraint set and produce at a substantially lowest cost a predicted process metric value substantially as close as possible to the target process metric value.

20. The method of claim 19, wherein step (b) comprises:
providing a target metric value for a metric associated with a process, the process comprising a sequence of sub-processes;
providing a nonlinear regression model that has been trained in the relationship between the sub-process metrics and the process metric such that the nonlinear regression model can determine a predicted process metric value based on the sub-process metric value of the deviating sub-process; and
using the nonlinear regression model and an optimizer to determine values for the sub-process metrics of sub-processes to define target sub-process metric values, wherein said values are within a constraint set and produce at a substantially lowest cost a predicted process metric value substantially as close as possible to the target process metric value.

21. The method of claim 19, wherein the values for the sub-process metrics of sub-processes that are later in the process sequence than the deviating sub-process of step (f) define compensating target sub-process metric values; and the method further comprises the steps of:
(g) providing one or more ranges of acceptable values for one or more sub-process operational variables to define an operational variable constraint set;
(h) providing a nonlinear regression model that has been trained in the relationship between one ore more of the sub-process operational variables and the sub-process metrics of said sub-process such that the nonlinear regression model can determine a predicted sub-process metric value for said sub-process from the sub-process operational variable values; and
(i) using the nonlinear regression model and an optimizer to determine target values for one or more of the sub-process operational variables within the operational variable constraint set that produce at a substantially lowest cost a predicted sub-process metric for said sub-process as close as possible to the compensating target sub-process metric value for said sub-process.

22. The method of claim 21, further comprising the steps of:
(j) measuring at least one of one or more sub-process metrics and one or more sub-process operational variables; and
(k) adjusting one or more sub-process operational variables as close as possible to the target value for the sub-process operational variable.

23. The method of claim 19, wherein the optimizer associates costs with at least one of the sub-process operational variables.

24. An article of manufacture having a computer-readable medium with computer-readable instructions embodied thereon for performing the method of claim 19.

25. A data processing device for optimizing a process having an associated metric and comprising a plurality of sub-processes, the device receiving a target metric value for the process and one or more ranges of acceptable values for the sub-process metrics to define a constraint set, and executing a nonlinear regression model that has been trained in the relationship between the sub-process metrics and the process metric such that the nonlinear regression model can determine a predicted process metric value from the measured sub-process metric values, the device being configured to use the nonlinear regression model and an optimizer to determine values for the sub-process metrics within the constraint set that produce at a substantially lowest cost a predicted process metric value substantially as close as possible to the target process metric value.

26. A data processing device for optimizing a process having an associated metric and comprising a plurality of sub-processes, the device receiving a target metric value for the process and one or more ranges of acceptable values for the sub-process metrics and the sub-process operational variables to define a sub-process constraint set, and executing a nonlinear regression model that has been trained in the relationship between the sub-process metrics and sub-process operational variables and the process metric such that the nonlinear regression model can determine a predicted process metric value from the measured sub-process metric and operational variable values, the device being configured to use the nonlinear regression model and an optimizer to determine values for the sub-process metrics and the sub-process operational variables within the sub-process constraint set that produce at a substantially lowest cost a predicted process metric substantially as close as possible to the target process metric.

27. A data processing device for compensating for sub-process deviation from an acceptable range about a target metric, the device receiving (i) a target metric value for a metric associated with a process, the process comprising a sequence of sub-processes, (ii) a target sub-process metric value for a metric associated with a sub-process of the process, and (iii) one or more ranges of acceptable values for the sub-process metrics to define a constraint set, the device detecting a substantial deviation in at least one sub-process metric value of one sub-process from the target sub-process metric value for said sub-process that defines a deviating sub-process and comprising a nonlinear regression model that has been trained in the relationship between the sub-process metrics and the process metric such that the nonlinear regression model can determine a predicted process metric value based on the sub-process metric value of the deviating sub-process, the device being configured to use the nonlinear regression model and an optimizer to determine values for the sub-process metrics of sub-processes that are later in the process sequence than the deviating sub-process, wherein said values are within the constraint set and produce at a substantially lowest cost a predicted process metric value substantially as close as possible to the target process metric value.

* * * * *